United States Patent
Hsieh et al.

(10) Patent No.: US 9,411,133 B1
(45) Date of Patent: Aug. 9, 2016

(54) IMAGING LENS SYSTEM, IMAGE CAPTURING DEVICE AND ELECTRONIC DEVICE

(71) Applicant: LARGAN PRECISION CO., LTD., Taichung (TW)

(72) Inventors: Dung-Yi Hsieh, Taichung (TW); Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 14/742,463

(22) Filed: Jun. 17, 2015

(30) Foreign Application Priority Data

Feb. 2, 2015 (TW) .............................. 104103389 A

(51) Int. Cl.
| | |
|---|---|
| *G02B 13/18* | (2006.01) |
| *G02B 9/08* | (2006.01) |
| *G02B 9/60* | (2006.01) |
| *G02B 13/00* | (2006.01) |
| *H04N 5/232* | (2006.01) |
| *G02B 27/00* | (2006.01) |
| *G02B 3/04* | (2006.01) |
| *G02B 5/00* | (2006.01) |

(52) U.S. Cl.
CPC ............ *G02B 13/0045* (2013.01); *H04N 5/232* (2013.01); *G02B 3/04* (2013.01); *G02B 5/005* (2013.01); *G02B 9/60* (2013.01); *G02B 13/002* (2013.01); *G02B 13/0015* (2013.01); *G02B 13/18* (2013.01); *G02B 27/0025* (2013.01)

(58) Field of Classification Search
CPC ...... G02B 13/0045; G02B 9/60; G02B 13/18; G02B 27/0025; G02B 5/005; G02B 13/0015; G02B 3/04; G02B 13/002

USPC .......................... 359/714, 739, 740, 764–766
See application file for complete search history.

(56) References Cited

U.S. PATENT DOCUMENTS

| | | | |
|---|---|---|---|
| 7,864,454 B1 | 1/2011 | Tang et al. | |
| 8,233,224 B2 * | 7/2012 | Chen | G02B 9/60 359/714 |
| 2013/0265650 A1 * | 10/2013 | Chen | G02B 13/008 359/714 |
| 2014/0063596 A1 * | 3/2014 | Jung | G02B 13/0045 359/714 |
| 2014/0104709 A1 * | 4/2014 | You | G02B 13/0045 359/764 |

(Continued)

FOREIGN PATENT DOCUMENTS

| | | |
|---|---|---|
| CN | 203773145 | 8/2014 |
| JP | 59083121 | 5/1984 |

(Continued)

*Primary Examiner* — Evelyn A Lester
(74) *Attorney, Agent, or Firm* — Locke Lord LLP; Tim Tingkang Xia, Esq.

(57) ABSTRACT

This disclosure provides an imaging lens system, including, in order from an object side to an image side: a first lens element with positive refractive power having a convex object-side surface; a second lens element with negative refractive power; a third lens element with refractive power; a fourth lens element with refractive power having an object-side surface and an image-side surface thereof being aspheric; a fifth lens element with refractive power having a convex object-side surface, the object-side surface and an image-side surface thereof being aspheric, and at least one of the object-side surface and the image-side surface being provided with at least one inflection point. The imaging lens system is further provided with a stop, and no lens element with refractive power is disposed between the stop and first lens element.

30 Claims, 24 Drawing Sheets

(56) References Cited

U.S. PATENT DOCUMENTS

| | | | |
|---|---|---|---|
| 2014/0139933 A1* | 5/2014 | Chen | G02B 13/0045 359/714 |
| 2014/0146215 A1* | 5/2014 | Chen | G02B 9/60 359/714 |
| 2014/0160343 A1* | 6/2014 | You | G02B 13/0045 359/764 |
| 2014/0204480 A1 | 7/2014 | Jo et al. | |
| 2015/0022700 A1* | 1/2015 | Chen | G02B 9/60 359/714 |
| 2015/0077864 A1* | 3/2015 | Noda | G02B 13/18 359/714 |
| 2015/0168690 A1* | 6/2015 | Kondo | G02B 13/0045 359/714 |
| 2015/0226939 A1* | 8/2015 | Kanda | G02B 9/60 359/714 |
| 2015/0286036 A1* | 10/2015 | Kondo | G02B 13/0045 359/714 |

FOREIGN PATENT DOCUMENTS

| | | |
|---|---|---|
| TW | 201415068 A | 4/2014 |
| TW | 201441657 A | 11/2014 |
| WO | 2013099255 A1 | 7/2013 |
| WO | 2014119283 A1 | 8/2014 |
| WO | 2014155460 A1 | 10/2014 |
| WO | 2014155465 A1 | 10/2014 |
| WO | 2014155468 A1 | 10/2014 |

\* cited by examiner ial Number 104103389, filed Feb. 2, 2015, which is incorporated by reference herein in its entirety.

IMAGING LENS SYSTEM, IMAGE CAPTURING DEVICE AND ELECTRONIC DEVICE

RELATED APPLICATIONS

This application claims priority to Taiwan Application Serial Number 104103389, filed Feb. 2, 2015, which is incorporated by reference herein in its entirety.

BACKGROUND

1. Technical Field

The present disclosure relates to an imaging lens system and an image capturing device, and more particularly, to an imaging lens system and an image capturing device applicable to electronic devices.

2. Description of Related Art

As personal electronic products have been becoming more and more compact, the internal components of the electronic products are also required to be smaller in size than before, resulting in an increasing demand for compact imaging lens systems. In addition to the demand of miniaturization, the reduction of the pixel size of sensors in the advancement of semiconductor manufacturing technologies has enabled imaging lens systems to evolve toward the field of higher megapixels. Meanwhile, the popularity of smart phones and tablet computers greatly boosts the need for compact imaging lens systems featuring high image quality.

A conventional telephoto optical system generally adopts a multi-element structure and comprises glass lens elements with spherical surfaces. Such a configuration not only results in a bulky optical system with low portability, but the arrangement of refractive power causes problems such as poor convergent performance of the light beam, aberrations and chromatic aberrations. Moreover, the improper configuration of the spacing between and thicknesses of the lens elements may lead to the problem of insufficient space for the light beam to travel therebetween, thereby causing aberrations and high order aberrations.

Therefore, a need exists in the art for an imaging lens system that features a compact size and high image quality.

SUMMARY

According to one aspect of the present disclosure, an imaging lens system includes, in order from an object side to an image side: a first lens element with positive refractive power having an object-side surface being convex in a paraxial region thereof; a second lens element with negative refractive power; a third lens element with refractive power; a fourth lens element with refractive power, an object-side surface and an image-side surface thereof being aspheric; and a fifth lens element with refractive power having an object-side surface being convex in a paraxial region thereof, the object-side surface and an image-side surface thereof being aspheric and at least one of which being provided with at least one inflection point; wherein the imaging lens system is further provided with a stop, and no lens element with refractive power is disposed between the stop and the first lens element; wherein the imaging lens system has a total of five lens elements with refractive power; wherein an axial distance between the second lens element and the third lens element is T23, an axial distance between the third lens element and the fourth lens element is T34, a central thickness of the second lens element is CT2, a central thickness of the third lens element is CT3, a central thickness of the fourth lens element is CT4, a central thickness of the fifth lens element is CT5, a focal length of the imaging lens system is f, a focal length of the first lens element is f1, a focal length of the second lens element is f2, a focal length of the fourth lens element is f4, a focal length of the fifth lens element is f5, an axial distance between the stop and the image-side surface of the fifth lens element is SD, an axial distance between the object-side surface of the first lens element and the image-side surface of the fifth lens element is TD, and the following conditions are satisfied:

$0.90 < (T23+T34)/(CT3+CT4+CT5);$ $(|f/f4|+|f/f5|)/(|f/f1|+|f/f2|) < 0.60;$ $0.7 < SD/TD < 1.1;$ and $1.0 < (CT2+CT4)/(CT2-CT4).$ According to another aspect of the present disclosure, an image capturing device includes the aforementioned imaging lens system and an image sensor.

According to another aspect of the present disclosure, an electronic device includes the aforementioned image capturing device.

According to another aspect of the present disclosure, an imaging lens system includes, in order from an object side to an image side: a first lens element with positive refractive power having an object-side surface being convex in a paraxial region thereof; a second lens element with negative refractive power having an object-side surface being convex in a paraxial region thereof and an image-side surface being concave in a paraxial region thereof; a third lens element with refractive power; a fourth lens element with negative refractive power, an object-side surface and an image-side surface thereof being aspheric; and a fifth lens element with refractive power having an image-side surface being concave in a paraxial region thereof, an object-side surface and the image-side surface thereof being aspheric and at least one of which being provided with at least one inflection point; wherein the imaging lens system is further provided with a stop, and no lens element with refractive power is disposed between the stop and the first lens element; wherein the imaging lens system has a total of five lens elements with refractive power; wherein an axial distance between the second lens element and the third lens element is T23, an axial distance between the third lens element and the fourth lens element is T34, a central thickness of the third lens element is CT3, a central thickness of the fourth lens element is CT4, a central thickness of the fifth lens element is CT5, a focal length of the imaging lens system is f, a focal length of the first lens element is f1, a focal length of the second lens element is f2, a focal length of the fourth lens element is f4, a focal length of the fifth lens element is f5, an axial distance between the stop and the image-side surface of the fifth lens element is SD, an axial distance between the object-side surface of the first lens element and the image-side surface of the fifth lens element is TD, and the following conditions are satisfied:

$0.90 < (T23+T34)/(CT3+CT4+CT5);$ $(|f/f4|+|f/f5|)/(|f/f1|+|f/f2|) < 1.0;$ $0.7 < SD/TD < 1.1;$ and $0.3 < CT4/CT3 < 2.5.$ According to another aspect of the present disclosure, an imaging lens system includes, in order from an object side to an image side: a first lens element with positive refractive power having an object-side surface being convex in a paraxial region thereof; a second lens element with negative refractive power; a third lens element with refractive power; a fourth lens element with negative refractive power having an object-side surface being concave in a paraxial region thereof, the object-side surface and an image-side surface thereof being aspheric; and a fifth lens element with refractive power having an image-side surface being concave in a paraxial region thereof, an object-side surface and the image-side surface thereof being aspheric and at least one of which being provided with at least one inflection point; wherein the imaging lens system is further provided with a stop, and no lens element with refractive power is disposed between the stop and the first lens element; wherein the imaging lens system has a total of five lens elements with refractive power; wherein an axial distance between the second lens element and the third lens element is T23, an axial distance between the third lens element and the fourth lens element is T34, a central thickness of the third lens element is CT3, a central thickness of the fourth lens element is CT4, a central thickness of the fifth lens element is CT5, a focal length of the imaging lens system is f, a focal length of the first lens element is f1, a focal length of the second lens element is f2, a focal length of the fourth lens element is f4, a focal length of the fifth lens element is f5, an axial distance between the stop and the image-side surface of the fifth lens element is SD, an axial distance between the object-side surface of the first lens element and the image-side surface of the fifth lens element is TD, and the following conditions are satisfied:

0.90<(T23+T34)/(CT3+CT4+CT5);

(|f/f4|+|f/f5|)/(|f/f1|+|f/f2|)<1.0;

0.7<SD/TD<1.1; and 0.3<CT4/CT3<2.5.

In any of the aforementioned imaging lens systems of the present disclosure, the first lens element is configured to have positive refractive power so as to enhance the convergent performance of the light beam and to effectively control the total track length of the imaging lens system, and the second lens element has negative refractive power so as to favorably correct the aberration created by the first lens element and the chromatic aberration at the same time. Moreover, the arrangement of the first lens element with positive refractive power and the second lens element with negative refractive power is favorable for forming a telephoto structure so that certain area has a higher resolution.

When (T23+T34)/(CT3+CT4+CT5) satisfies the above condition, the adjustment of the spacings between lens elements in the middle of the imaging lens system and the thickness(es) of the lens element(s) close to the image-side end provides a sufficient space for the light beam and thereby to correct the aberration created due to constricted space.

When SD/TD satisfies the above condition, the total track length of the imaging lens system can be effectively reduced to prevent the imaging lens system from being too bulky while the incident angle of the light is controlled.

When (|f/f4|+|f/f5|)/(|f/f1|+|f/f2|) satisfies the above condition, the imaging lens system's control capability at the region close to the object-side end can be reinforced, and the lens element at the image-side end has an enhanced performance in correcting high order aberrations.

When (CT2+CT4)/(CT2−CT4) satisfies the above condition, the effective optical path length of the second lens element can be enhanced, and it is favorable for mitigating the distribution of the refractive power of the fourth lens element to correct the aberration at the periphery of the imaging lens system, thereby obtaining a better image quality of a distant view image.

When CT4/CT3 satisfies the above condition, the thicknesses of the lens elements can be effectively controlled to improve the manufacturability of the product and reduce the sensitivity.

DETAILED DESCRIPTION

Figure 1A:
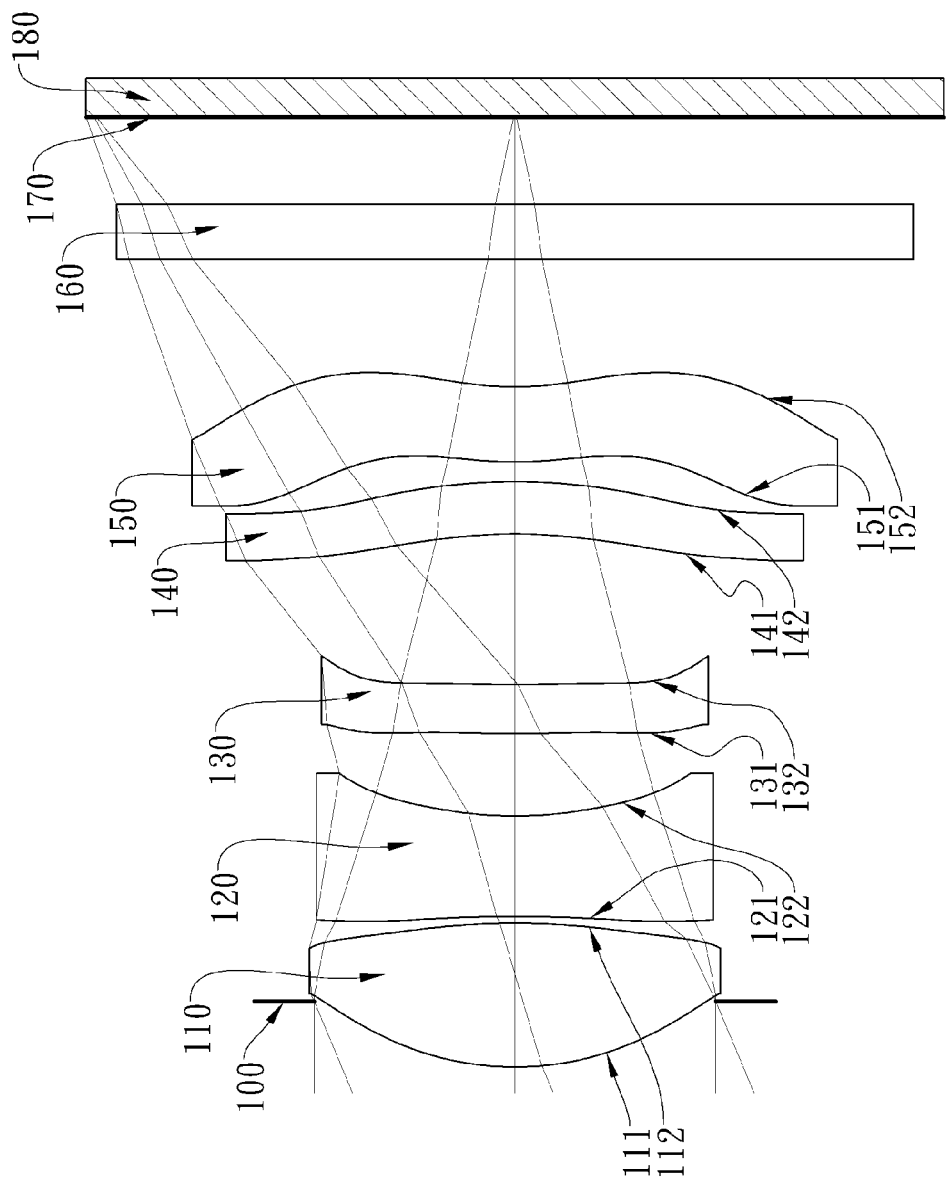
FIG. 1A is a schematic view of an image capturing device according to the first embodiment of the present disclosure.

The present disclosure provides an imaging lens system including, in order from an object side to an image side, a first lens element, a second lens element, a third lens element, a fourth lens element, and a fifth lens element, wherein the imaging lens system has a total of five lens elements with refractive power. The imaging lens system is further provided with a stop, and no lens element with refractive power is disposed between the stop and the first lens element.

The first lens element has positive refractive power so that it provides the imaging lens system with part of positive refractive power as it needs to be to favorably enhance the convergent performance of the light beam, thereby effectively controlling the total track length of the imaging lens system. The object-side surface of the first lens element is convex in a paraxial region thereof so that the distribution of the positive refractive power can be adjusted and thereby to shorten the total track length.

The second lens element has negative refractive power, so that it is favorable for correcting the aberration created by the first lens element and the chromatic aberration at the same time. The object-side surface of the second lens element may be convex in a paraxial region thereof and the image-side surface of the second lens element may be concave in a paraxial region thereof so as to favorably correct the astigmatism. The arrangement of the first lens element with positive refractive power and the second lens element with negative refractive power is more favorable for forming a telephoto structure so that certain area has a higher resolution.

The third lens element may have positive refractive power, so that it is favorable for balancing the distribution of the refractive power of the imaging lens system and thereby to reduce the sensitivity of the imaging lens system. At least one of the object-side surface and the image-side surface of the third lens element may be provided with at least one inflection point so as to favorably correct the aberration of the off-axis field and to suppress the incident angle of the light projecting onto an image sensor from the off-axis field to increase the receiving efficiency of the image sensor. The curvature radiuses of the object-side surface and the image-side surface of the third lens element are both either positive or negative so as to enhance the capability of correcting the astigmatism.

The fourth lens element may have negative refractive power. The object-side surface of the fourth lens element may be concave in a paraxial region thereof and the image-side surface of the fourth lens element may be convex in a paraxial region thereof so as to favorably correct the astigmatism and thereby to improve the image quality.

The fifth lens element may have negative refractive power so that the back focal length of the imaging lens system can be favorably reduced to keep the imaging lens system compact. The object-side surface of the fifth lens element may be convex in a paraxial region thereof and the image-side surface of the fifth lens element may be concave in a paraxial region thereof so as to facilitate further correction of the aberration. At least one of the object-side surface and the image-side surface of the fifth lens element is provided with at least one inflection point so as to effectively correct the aberration of the off-axis field.

When an axial distance between the second lens element and the third lens element is T23, an axial distance between the third lens element and the fourth lens element is T34, a central thickness of the third lens element is CT3, a central thickness of the fourth lens element is CT4, a central thickness of the fifth lens element is CT5, and the following condition is satisfied: $0.90<(T23+T34)/(CT3+CT4+CT5)$, the adjustment of the spacings between lens elements in the middle of the imaging lens system and the thickness(es) of the lens element(s) close to the image-side end provides a sufficient space for the light beam and thereby to correct the aberration created due to constricted space. Preferably, the following condition is satisfied: $1.0<(T23+T34)/(CT3+CT4+CT5)$, and most preferably, the following condition is satisfied: $1.15<(T23+T34)/(CT3+CT4+CT5)$.

When a focal length of the imaging lens system is f, a focal length of the first lens element is f1, a focal length of the second lens element is f2, a focal length of the fourth lens element is f4, a focal length of the fifth lens element is f5, and the following condition is satisfied: $(|f/f4|+|f/f5|)/(|f/f1|+|f/f2|)<1.0$, the imaging lens system's control capability at the region close to the object-side end can be reinforced, and the lens element at the image-side end has an enhanced performance in correcting high order aberrations. Preferably, the following condition is satisfied: $(|f/f4|+|f/f5|)/(|f/f1|+|f/f2|)<0.60$.

When an axial distance between the stop and the image-side surface of the fifth lens element is SD, an axial distance between the object-side surface of the first lens element and the image-side surface of the fifth lens element is TD, and the following condition is satisfied: $0.7<SD/TD<1.1$, the total track length of the imaging lens system can be effectively reduced to prevent the imaging lens system from being too bulky while the incident angle of the light is controlled.

When a central thickness of the second lens element is CT2, the central thickness of the fourth lens element is CT4, and the following condition is satisfied: $1.0<(CT2+CT4)/(CT2-CT4)$, the effective optical path length of the second lens element can be enhanced, and it is favorable for mitigating the distribution of the refractive power of the fourth lens element to correct the aberration at the periphery of the system, thereby obtaining a better image quality of a distant view image. Preferably, the following condition is satisfied: $2.0<(CT2+CT4)/(CT2-CT4)<50$.

When the central thickness of the third lens element is CT3, the central thickness of the fourth lens element is CT4, and the following condition is satisfied: $0.3<CT4/CT3<2.5$, the thicknesses of the lens elements can be effectively controlled to improve the manufacturability of the product and reduce the sensitivity.

When the focal length of the first lens element is f1, the focal length of the fourth lens element is f4, and the following condition is satisfied: $-1.0<f1/f4<0$, the distribution of the refractive power of the first lens element and the fourth lens element is more balanced and thereby to reduce the sensitivity and the aberration of the imaging lens system. Preferably, the following condition is satisfied: $-0.5<f1/f4<0$.

When an Abbe number of the first lens element is V1, an Abbe number of the second lens element is V2, an Abbe number of the fourth lens element is V4, and the following condition is satisfied: $0.5<(V2+V4)/V1<1.0$, the chromatic aberration of the imaging lens system can be effectively corrected to improve the image quality.

When the focal length of the imaging lens system is f, a maximum image height of the imaging lens system is ImgH (i.e. half of a diagonal length of an effective photosensitive area of the image sensor), and the following condition is satisfied: 1.9<f/ImgH<5.0, it is favorable for keeping the imaging lens system compact and obtaining good image quality.

When a curvature radius of the object-side surface of the fourth lens element is R7, a curvature radius of the image-side surface of the fourth lens element is R8, and the following condition is satisfied: −35<(R7+R8)/(R7−R8)<−1.0, it is favorable for reducing the astigmatism so as to maintain good image quality.

When the maximum image height of the imaging lens system is ImgH, the axial distance between the second lens element and the third lens element is T23, the axial distance between the third lens element and the fourth lens element is T34, and the following condition is satisfied: 1.0<ImgH/(T23+T34)<2.2, the distances between the lens elements are more appropriate and favorable for keeping the imaging lens system compact.

When the focal length of the imaging lens system is f, the focal length of the first lens element is f1, the focal length of the second lens element is f2, and the following condition is satisfied: 2.5<|f/f1|+|f/f2|, it is favorable for forming a telephoto structure so that certain area has a higher resolution.

When the focal length of the imaging lens system is f, a vertical distance between a critical point on the image-side surface of the fifth lens element and the optical axis is Yc52, and the following condition is satisfied: 3.0<f/Yc52<20, the aberration of the off-axis field can be favorably corrected to improve the image quality at the off-axis field.

When half of a maximal field of view of the imaging lens system is HFOV, and the following condition is satisfied: 10.0 [deg.]<HFOV<30.0 [deg.], an appropriate image capturing range is available for the imaging lens system under the telephoto structure.

When a maximum effective radius of the object-side surface of the first lens element is SD11, an entrance pupil diameter of the imaging lens system is EPD, and the following condition is satisfied: 0.95<EPD/(SD11*2)<1.1, it is favorable for forming a telephoto structure and providing a sufficient amount of incident light, thereby increasing the response speed of the image sensor.

When the maximum image height of the imaging lens system is ImgH, the entrance pupil diameter of the imaging lens system is EPD, and the following condition is satisfied: 0.85<EPD/ImgH<2.0, a sufficient amount of incident light can be provided, and it is favorable for keeping the imaging lens system compact so that it can be equipped in a compact portable electronic product.

According to the imaging lens system of the present disclosure, the lens elements thereof can be made of glass or plastic material. When the lens elements are made of glass material, the distribution of the refractive power of the imaging lens system may be more flexible to design. When the lens elements are made of plastic material, the manufacturing cost can be effectively reduced. Furthermore, surfaces of each lens element can be arranged to be aspheric (ASP). Since the aspheric surface of the lens element is easy to form a shape other than spherical surfaces so as to have more controllable variables for eliminating the aberration thereof and to further decrease the required number of the lens elements, the total track length of the imaging lens system can be effectively reduced.

The imaging lens system of the present disclosure can include at least one stop, such as an aperture stop, a glare stop or a field stop.

According to the imaging lens system of the present disclosure, a stop can be configured as a front stop or a middle stop. A front stop disposed between an imaged object and the first lens element can provide a longer distance between an exit pupil of the imaging lens system and the image surface, thereby the generated telecentric effect improves the image-sensing efficiency of an image sensor, such as a CCD or CMOS sensor. A middle stop disposed between the first lens element and the image surface is favorable for enlarging the field of view of the imaging lens system and thereby to provide a wider field of view for the same.

According to the imaging lens system of the present disclosure, when the lens element has a convex surface and the region of convex shape is not defined, it indicates that the surface is convex in the paraxial region thereof; when the lens element has a concave surface and the region of concave shape is not defined, it indicates that the surface is concave in the paraxial region thereof. Likewise, when the region of refractive power or focal length of a lens element is not defined, it indicates that the region of refractive power or focal length of the lens element is in the paraxial region thereof.

According to the imaging lens system of the present disclosure, an image surface of the imaging lens system, based on the corresponding image sensor, can be a plane or a curved surface with any curvature, especially a curved surface being concave facing towards the object side.

Figure 12:
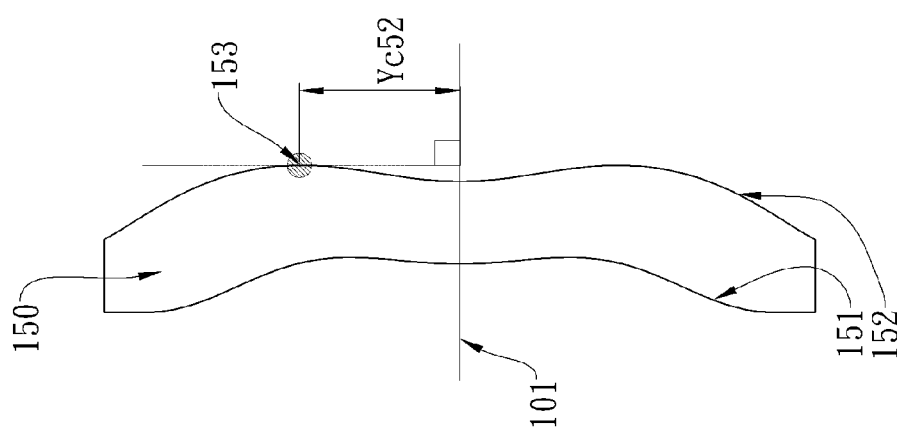
FIG. 12 shows the critical point according to the present disclosure.

A critical point on a lens surface is a tangential point where the tangential plane, which is perpendicular to the optical axis, is tangent to the lens surface. It is to be noted that the critical point is an extremum point closest to (but not located at) the optical axis. FIG. 12 is a schematic view showing a critical point 153 on an image-side surface 152 of a fifth lens element 150 of an imaging lens system shown in FIG. 1A. A vertical distance between the critical point 153 on the image-side surface 152 of the fifth lens element 150 and an optical axis 101 is Yc52.

The imaging lens system of the present disclosure can be optionally applied to moving focus optical systems. According to the imaging lens system of the present disclosure, the imaging lens system features good aberration correction performance and high image quality, and can be applied to electronic devices, such as 3D (three-dimensional) image capturing applications digital cameras, mobile devices, digital tablets, smart TV, monitoring device over network, motion sensing input device, driving recording system, rear view camera system, and wearable devices.

According to the present disclosure, an image capturing device includes the aforementioned imaging lens system and an image sensor, wherein the image sensor is disposed on or near an image surface of the imaging lens system. Therefore, the design of the imaging lens system enables the image capturing device to achieve the best image quality. Preferably, the image capturing device can further include a barrel member, a holder member or a combination thereof.

Figure 11A:
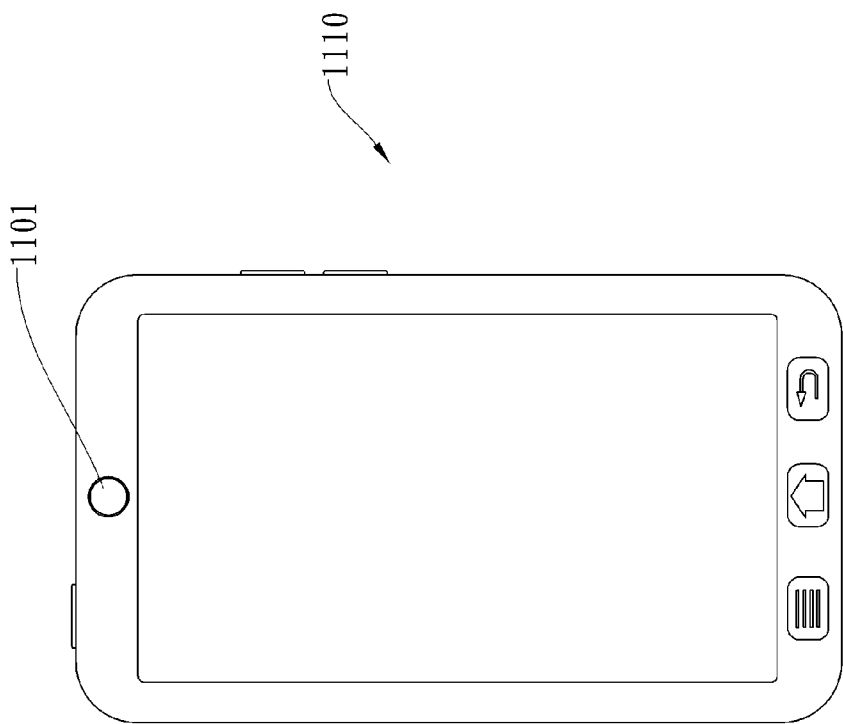
FIG. 11A shows a smart phone with an image capturing device of the present disclosure installed therein.
Figure 11B:
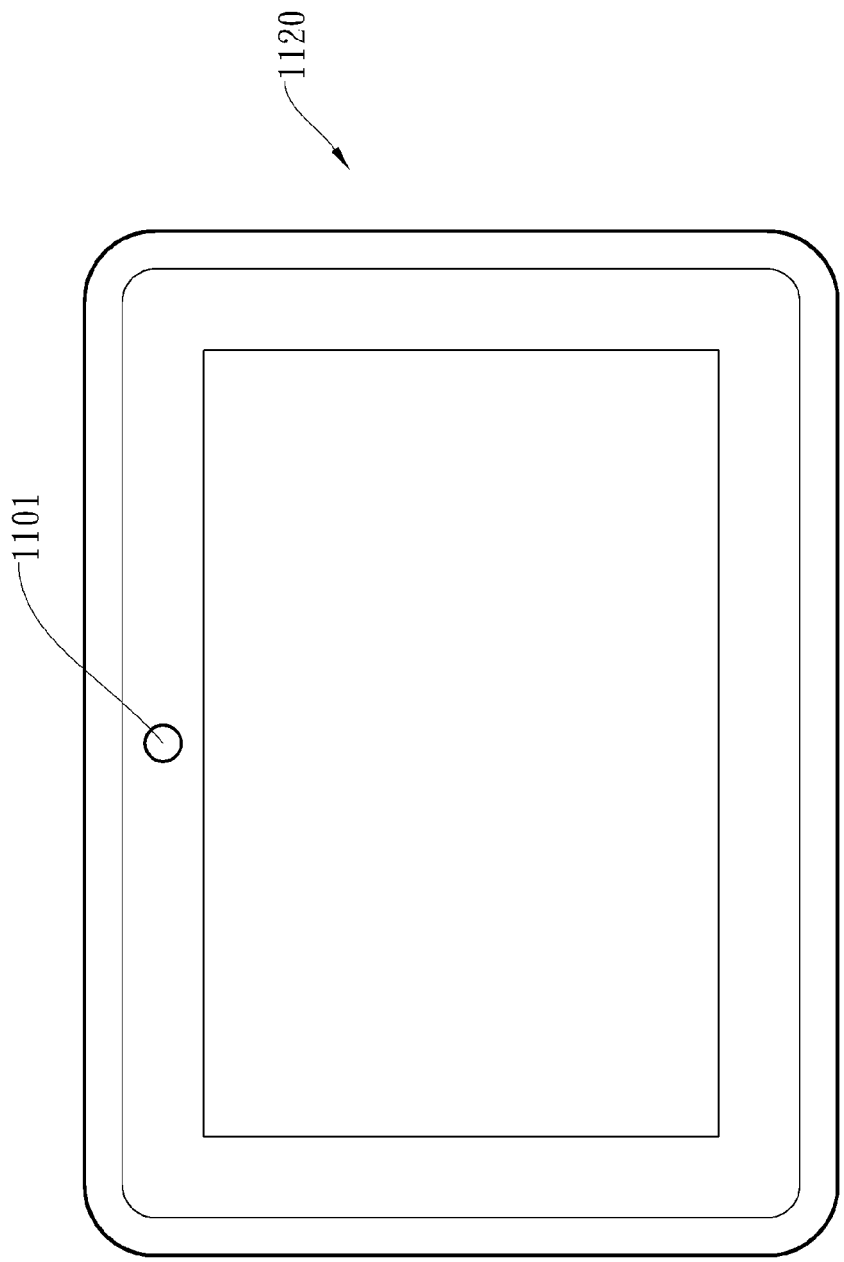
FIG. 11B shows a tablet personal computer with an image capturing device of the present disclosure installed therein.
Figure 11C:
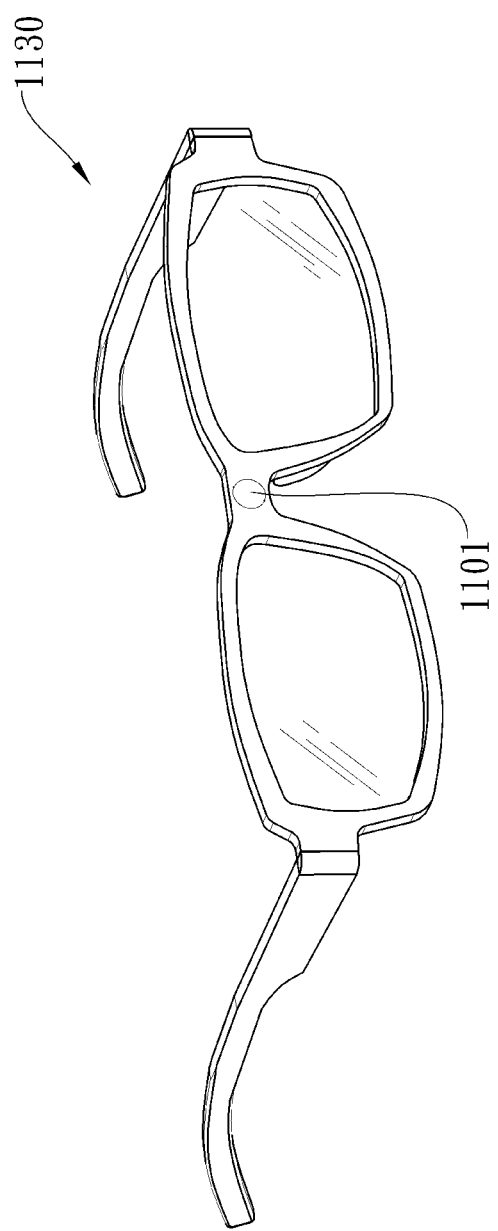
FIG. 11C shows a wearable device with an image capturing device of the present disclosure installed therein.

Referring to FIG. 11A, FIG. 11B and FIG. 11C, an image capturing device 1101 may be installed in a variety of electronic devices, including, but not limited to, a smart phone 1110, a tablet personal computer 1120 and a wearable device 1130. The three exemplary figures of different kinds of electronic devices are only exemplary for showing the image capturing device of present disclosure installed in an electronic device and are not limited thereto. Preferably, the electronic device can further include a control unit, a display unit, a storage unit, a random access memory unit (RAM) or a combination thereof.

According to the above description of the present disclosure, the following 1st-10th specific embodiments are provided for further explanation.

1st Embodiment

Figure 1B:
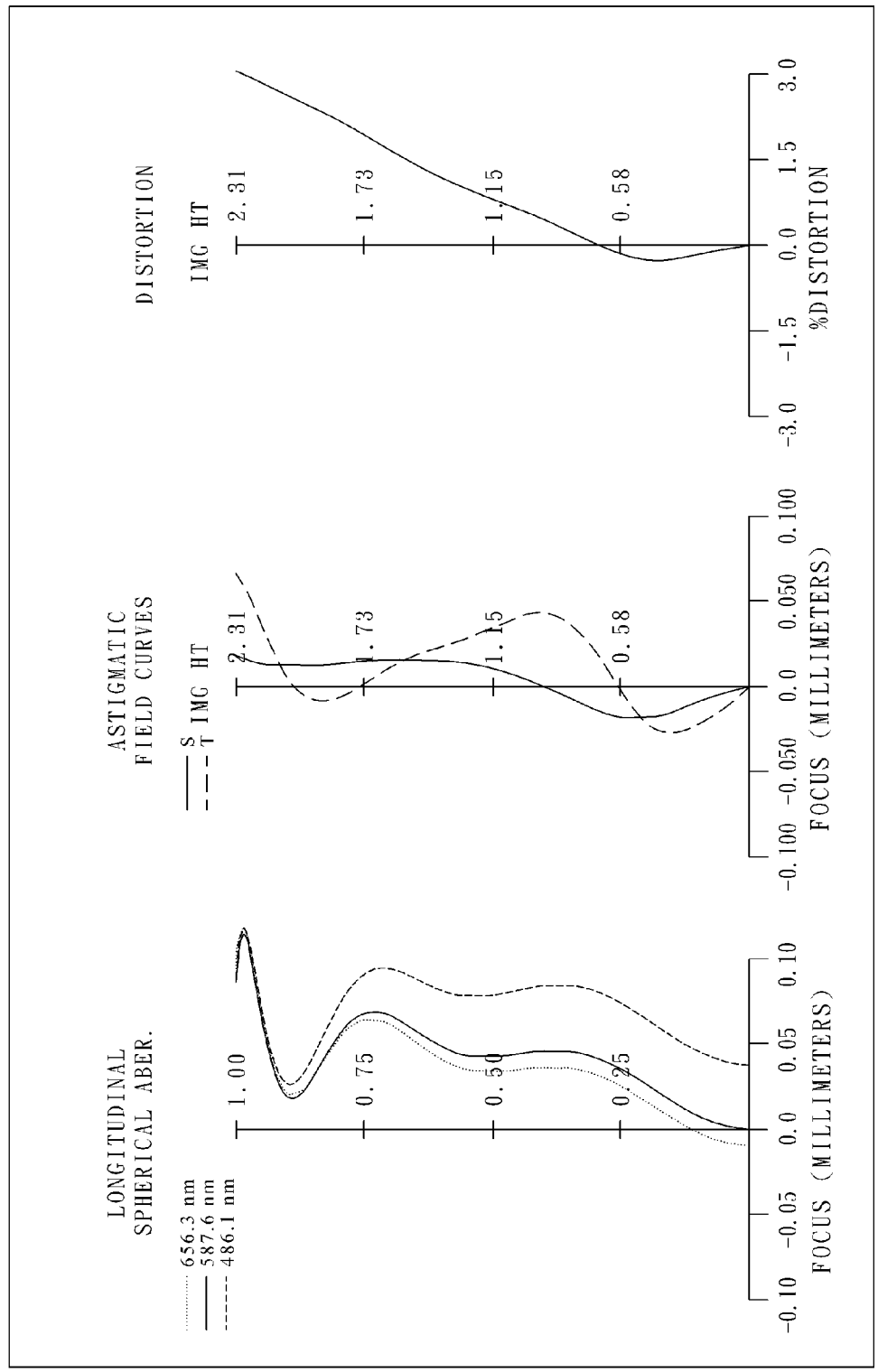
FIG. 1B shows longitudinal spherical aberration curves, astigmatic field curves and a distortion curve of the image capturing device according to the first embodiment.

FIG. 1A is a schematic view of an image capturing device according to the 1st embodiment of the present disclosure. FIG. 1B shows, in order from left to right, longitudinal spherical aberration curves, astigmatic field curves and a distortion curve of the image capturing device according to the 1st embodiment.

In FIG. 1A, the image capturing device includes an imaging lens system (not otherwise herein labeled) of the present disclosure and an image sensor 180. The imaging lens system includes, in order from an object side to an image side, a first lens element 110, a second lens element 120, a third lens element 130, a fourth lens element 140, and a fifth lens element 150, wherein the imaging lens system has a total of five lens elements (110-150) with refractive power.

The first lens element 110 with positive refractive power has an object-side surface 111 being convex in a paraxial region thereof and an image-side surface 112 being convex in a paraxial region thereof, which are both aspheric, and the first lens element 110 is made of plastic material.

The second lens element 120 with negative refractive power has an object-side surface 121 being concave in a paraxial region thereof and an image-side surface 122 being concave in a paraxial region thereof, which are both aspheric, and the second lens element 120 is made of plastic material.

The third lens element 130 with positive refractive power has an object-side surface 131 being convex in a paraxial region thereof and an image-side surface 132 being concave in a paraxial region thereof, which are both aspheric, and the third lens element 130 is made of plastic material. Furthermore, each of the object-side surface 131 and the image-side surface 132 of the third lens element 130 has at least one inflection point.

The fourth lens element 140 with negative refractive power has an object-side surface 141 being concave in a paraxial region thereof and an image-side surface 142 being convex in a paraxial region thereof, which are both aspheric, and the fourth lens element 140 is made of plastic material.

The fifth lens element 150 with negative refractive power has an object-side surface 151 being convex in a paraxial region thereof and an image-side surface 152 being concave in a paraxial region thereof, which are both aspheric, and the fifth lens element 150 is made of plastic material. Furthermore, each of the object-side surface 151 and the image-side surface 152 of the fifth lens element 150 has at least one inflection point.

The imaging lens system is further provided with a stop 100 disposed between an imaged object and the first lens element 110, and no lens element with refractive power is disposed between the stop 100 and the first lens element 110. The imaging lens system further includes an IR-cut filter 160 placed between the fifth lens element 150 and an image surface 170. The IR-cut filter 160 is made of glass and will not affect the focal length of the imaging lens system. The image sensor 180 is disposed on or near the image surface 170 of the imaging lens system.

The equation of the aspheric surface profiles is expressed as follows:

$$X(Y) = (Y^2/R)/(1 + sqrt(1 - (1 + k)*(Y/R)^2)) + \sum_i (Ai)*(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the first embodiment, a focal length of the imaging lens system is f, an f-number of the imaging lens system is Fno, half of a maximal field of view of the imaging lens system is HFOV, and these parameters have the following values: f=5.27 mm; Fno=2.40; HFOV=22.7 degrees.

In the first embodiment, an Abbe number of the first lens element 110 is V1, an Abbe number of the second lens element 120 is V2, an Abbe number of the fourth lens element 140 is V4, and they satisfy the condition: (V2+V4)/V1=0.84.

In the first embodiment, an axial distance between the second lens element 120 and the third lens element 130 is T23, an axial distance between the third lens element 130 and the fourth lens element 140 is T34, a central thickness of the third lens element 130 is CT3, a central thickness of the fourth lens element 140 is CT4, a central thickness of the fifth lens element 150 is CT5, and they satisfy the condition: (T23+T34)/(CT3+CT4+CT5)=1.32.

In the first embodiment, a central thickness of the second lens element 120 is CT2, the central thickness of the fourth lens element 140 is CT4, and they satisfy the condition: (CT2+CT4)/(CT2−CT4)=3.17.

In the first embodiment, the central thickness of the fourth lens element 140 is CT4, the central thickness of the third lens element 130 is CT3, and they satisfy the condition: CT4/CT3=1.06.

In the first embodiment, a curvature radius of the object-side surface of the fourth lens element 140 is R7, a curvature radius of the image-side surface of the fourth lens element 140 is R8, and they satisfy the condition: (R7+R8)/(R7−R8)=−7.26.

In the first embodiment, the focal length of the imaging lens system is f, a focal length of the first lens element 110 is f1, a focal length of the second lens element 120 is f2, and they satisfy the condition: |f/f1|+|f/f2|=4.40.

In the first embodiment, the focal length of the first lens element 110 is f1, a focal length of the fourth lens element 140 is f4, and they satisfy the condition: f1/f4=−0.12.

In the first embodiment, the focal length of the imaging lens system is f, the focal length of the first lens element 110 is f1, the focal length of the second lens element 120 is f2, the focal length of the fourth lens element 140 is f4, a focal length of the fifth lens element 150 is f5, and they satisfy the condition: (|f/f4|+|f/f5|)/(|f/f1|+|f/f2|)=0.13.

In the first embodiment, the axial distance between the second lens element 120 and the third lens element 130 is T23, the axial distance between the third lens element 130 and the fourth lens element 140 is T34, a maximum image height of the imaging lens system is ImgH (i.e. half of a diagonal length of an effective photosensitive area of the image sensor), and they satisfy the condition: ImgH/(T23+T34)=1.81.

In the first embodiment, the focal length of the imaging lens system is f, the maximum image height of the imaging lens system is ImgH, and they satisfy the condition: f/ImgH=2.29.

In the first embodiment, an entrance pupil diameter of the imaging lens system is EPD, the maximum image height of the imaging lens system is ImgH, and they satisfy the condition: EPD/ImgH=0.95.

In the first embodiment, an axial distance between the stop 100 and the image-side surface of the fifth lens element 150 is SD, an axial distance between the object-side surface of the first lens element 110 and the image-side surface of the fifth lens element 150 is TD, and they satisfy the condition: SD/TD=0.90.

In the first embodiment, the focal length of the imaging lens system is f, a vertical distance between a critical point on the image-side surface of the fifth lens element 150 and the optical axis is Yc52, and they satisfy the condition: f/Yc52=6.71.

In the first embodiment, the entrance pupil diameter of the imaging lens system is EPD, a maximum effective radius of the object-side surface 111 of the first lens element 110 is SD11, and they satisfy the condition: EPD/(SD11*2)=0.99.

The detailed optical data of the first embodiment are shown in TABLE 1, and the aspheric surface data are shown in TABLE 2, wherein the units of the curvature radius, the thickness and the focal length are expressed in mm, and HFOV is half of the maximal field of view.

TABLE 1

(Embodiment 1)
f = 5.27 mm, Fno = 2.40, HFOV = 22.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.360 | | | | |
| 2 | Lens 1 | 1.611 | ASP | 0.787 | Plastic | 1.544 | 55.9 | 2.21 |
| 3 | | −3.934 | ASP | 0.036 | | | | |
| 4 | Lens 2 | −11.749 | ASP | 0.550 | Plastic | 1.639 | 23.5 | −2.61 |
| 5 | | 1.978 | ASP | 0.450 | | | | |
| 6 | Lens 3 | 5.630 | ASP | 0.270 | Plastic | 1.544 | 55.9 | 23.22 |
| 7 | | 9.982 | ASP | 0.824 | | | | |
| 8 | Lens 4 | −2.474 | ASP | 0.286 | Plastic | 1.639 | 23.5 | −18.61 |
| 9 | | −3.266 | ASP | 0.108 | | | | |
| 10 | Lens 5 | 2.061 | ASP | 0.410 | Plastic | 1.544 | 55.9 | −18.23 |
| 11 | | 1.587 | ASP | 0.700 | | | | |
| 12 | IR-cut filter | Plano | | 0.300 | Glass | 1.517 | 64.2 | |
| 13 | | Plano | | 0.476 | | | | |
| 14 | Image Surface | Plano | | — | | | | |

Note:
Reference Wavelength is d-line 587.6 nm

TABLE 2

Aspheric Coefficients

| | Surface # | | | | |
|---|---|---|---|---|---|
| | 2 | 3 | 4 | 5 | 6 |
| k = | −1.0636E−01 | −2.0368E+01 | −9.0000E+01 | −8.7888E+00 | −9.0000E+01 |
| A4 = | −8.2211E−03 | −5.3840E−02 | −1.1365E−01 | −6.4197E−02 | −2.8280E−01 |
| A6 = | 2.9345E−02 | 1.4397E−01 | 2.0677E−01 | 2.0498E−01 | 5.7291E−01 |
| A8 = | −4.5207E−02 | −8.6767E−02 | 3.3919E−02 | −2.5349E−01 | −1.7844E+00 |
| A10 = | −3.5354E−02 | −2.1093E−02 | −2.5367E−01 | 5.8293E−01 | 4.8988E+00 |
| A12 = | 8.6537E−02 | 4.1858E−02 | 1.9572E−01 | −6.3840E−01 | −6.5905E+00 |
| A14 = | −4.1233E−02 | −1.9393E−02 | −5.3417E−02 | 2.5250E−01 | 4.2515E+00 |
| A16 = | | | | | −1.0803E+00 |

| | Surface # | | | | |
|---|---|---|---|---|---|
| | 7 | 8 | 9 | 10 | 11 |
| k = | 2.0000E+01 | −5.8523E+01 | 1.6502E−02 | −1.5701E+01 | −5.8505E+00 |
| A4 = | −1.6857E−01 | −1.1095E−01 | 3.1501E−01 | −3.3843E−01 | −2.7939E−01 |
| A6 = | 2.1729E−01 | 1.4323E−01 | −1.5481E−01 | 9.6254E−02 | 1.5941E−01 |
| A8 = | −1.4077E−01 | −7.2109E−02 | 2.8497E−01 | 4.0344E−02 | −6.5206E−02 |
| A10 = | 6.0583E−01 | 3.5677E−02 | −2.0155E−01 | −2.4756E−02 | 1.9056E−02 |
| A12 = | −6.2811E−01 | −2.5259E−02 | 6.9548E−02 | 4.6145E−03 | −4.4807E−03 |
| A14 = | 1.7957E−01 | 1.0199E−02 | −1.1628E−02 | −3.7203E−04 | 8.3789E−04 |
| A16 = | | −1.4712E−03 | 7.3542E−04 | 1.1138E−05 | −7.6310E−05 |

2nd Embodiment

Figure 2A:
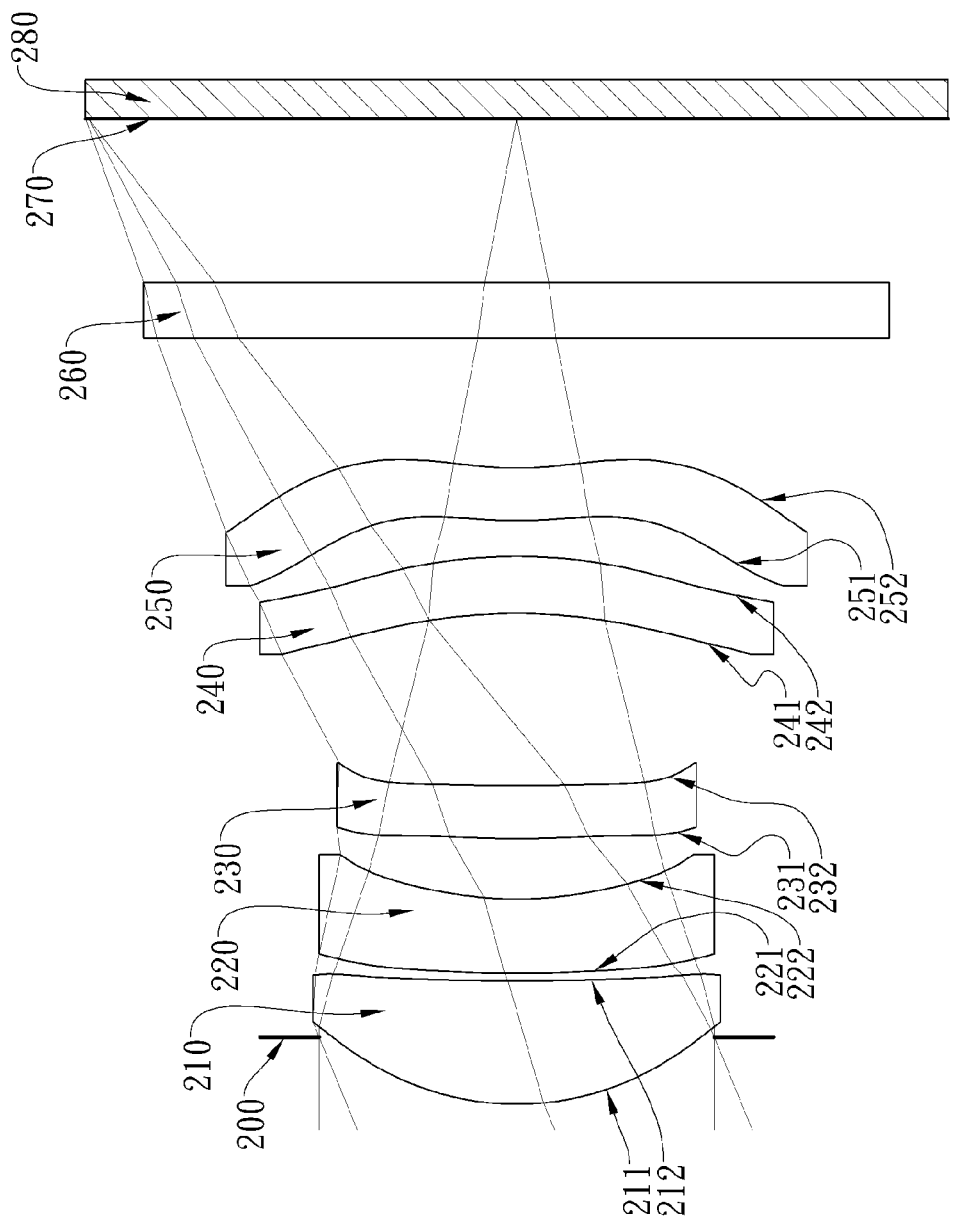
FIG. 2A is a schematic view of an image capturing device according to the second embodiment of the present disclosure.
Figure 2B:
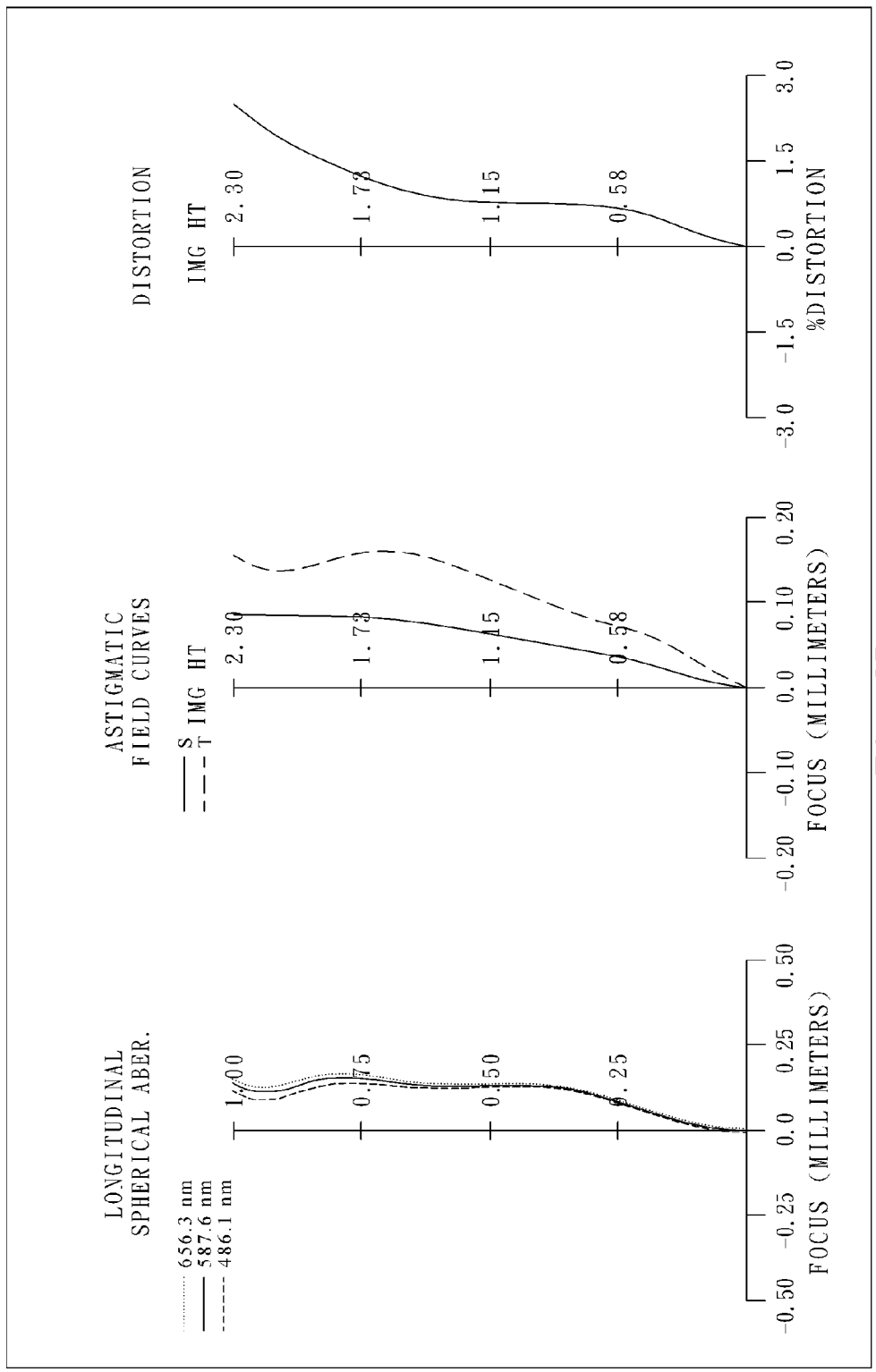
FIG. 2B shows longitudinal spherical aberration curves, astigmatic field curves and a distortion curve of the image capturing device according to the second embodiment.

FIG. 2A is a schematic view of an image capturing device according to the 2nd embodiment of the present disclosure. FIG. 2B shows, in order from left to right, longitudinal spherical aberration curves, astigmatic field curves and a distortion curve of the image capturing device according to the 2nd embodiment.

In FIG. 2A, the image capturing device includes an imaging lens system (not otherwise herein labeled) of the present disclosure and an image sensor 280. The imaging lens system includes, in order from an object side to an image side, a first lens element 210, a second lens element 220, a third lens element 230, a fourth lens element 240, and a fifth lens element 250, wherein the imaging lens system has a total of five lens elements (210-250) with refractive power.

The first lens element 210 with positive refractive power has an object-side surface 211 being convex in a paraxial region thereof and an image-side surface 212 being concave in a paraxial region thereof, which are both aspheric, and the first lens element 210 is made of plastic material.

The second lens element 220 with negative refractive power has an object-side surface 221 being convex in a paraxial region thereof and an image-side surface 222 being concave in a paraxial region thereof, which are both aspheric, and the second lens element 220 is made of plastic material.

The third lens element 230 with positive refractive power has an object-side surface 231 being convex in a paraxial region thereof and an image-side surface 232 being concave in a paraxial region thereof, which are both aspheric, and the third lens element 230 is made of plastic material. Furthermore, each of the object-side surface 231 and the image-side surface 232 of the third lens element 230 has at least one inflection point.

The fourth lens element 240 with negative refractive power has an object-side surface 241 being concave in a paraxial region thereof and an image-side surface 242 being convex in a paraxial region thereof, which are both aspheric, and the fourth lens element 240 is made of plastic material.

The fifth lens element 250 with negative refractive power has an object-side surface 251 being convex in a paraxial region thereof and an image-side surface 252 being concave in a paraxial region thereof, which are both aspheric, and the fifth lens element 250 is made of plastic material. Furthermore, each of the object-side surface 251 and the image-side surface 252 of the fifth lens element 250 has at least one inflection point.

The imaging lens system is further provided with a stop 200 disposed between an imaged object and the first lens element 210, and no lens element with refractive power is disposed between the stop 200 and the first lens element 210. The imaging lens system further includes an IR-cut filter 260 placed between the fifth lens element 250 and an image surface 270. The IR-cut filter 260 is made of glass and will not affect the focal length of the imaging lens system. The image sensor 280 is disposed on or near the image surface 270 of the imaging lens system.

The detailed optical data of the second embodiment are shown in TABLE 3, and the aspheric surface data are shown in TABLE 4, wherein the units of the curvature radius, the thickness and the focal length are expressed in mm, and HFOV is half of the maximal field of view.

TABLE 3

(Embodiment 2)
f = 5.31 mm, Fno = 2.50, HFOV = 22.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.360 | | | | |
| 2 | Lens 1 | 1.504 | ASP | 0.663 | Plastic | 1.544 | 55.9 | 3.11 |
| 3 | | 11.436 | ASP | 0.040 | | | | |
| 4 | Lens 2 | 4.998 | ASP | 0.400 | Plastic | 1.640 | 23.3 | −4.60 |
| 5 | | 1.794 | ASP | 0.325 | | | | |
| 6 | Lens 3 | 3.982 | ASP | 0.285 | Plastic | 1.544 | 55.9 | 14.84 |
| 7 | | 7.661 | ASP | 0.928 | | | | |
| 8 | Lens 4 | −2.642 | ASP | 0.306 | Plastic | 1.640 | 23.3 | −151.40 |
| 9 | | −2.839 | ASP | 0.194 | | | | |
| 10 | Lens 5 | 2.212 | ASP | 0.281 | Plastic | 1.640 | 23.3 | −12.17 |
| 11 | | 1.637 | ASP | 0.700 | | | | |
| 12 | IR-cut filter | Plano | | 0.300 | Glass | 1.517 | 64.2 | — |
| 13 | | Plano | | 0.879 | | | | |
| 14 | Image Surface | Plano | | — | | | | |

Note:
Reference wavelength is d-line 587.6 nm

TABLE 4

Aspheric Coefficients

| | Surface # | | | | |
|---|---|---|---|---|---|
| | 2 | 3 | 4 | 5 | 6 |
| k = | −8.7952E−02 | −9.0000E+01 | −6.1786E+01 | −8.3476E+00 | −5.1785E+01 |
| A4 = | −3.5796E−03 | −5.8184E−02 | −1.1111E−01 | −7.8177E−02 | −2.8541E−01 |
| A6 = | 3.3779E−02 | 1.4351E−01 | 2.0541E−01 | 2.1726E−01 | 5.8023E−01 |
| A8 = | −4.6115E−02 | −8.6916E−02 | 3.3553E−02 | −2.4354E−01 | −1.7820E+00 |

TABLE 4-continued

| Aspheric Coefficients | | | | | |
|---|---|---|---|---|---|
| A10 = | −3.6305E−02 | −2.1469E−02 | −2.5285E−01 | 5.8371E−01 | 4.9010E+00 |
| A12 = | 8.6358E−02 | 4.1507E−02 | 1.9676E−01 | −6.4121E−01 | −6.5897E+00 |
| A14 = | −4.0893E−02 | −1.9618E−02 | −5.2619E−02 | 2.4943E−01 | 4.2504E+00 |
| A16 = | | | | | −1.0830E+00 |

| | Surface # | | | | |
|---|---|---|---|---|---|
| | 7 | 8 | 9 | 10 | 11 |
| k = | −1.3288E+01 | −5.0821E+01 | 4.5189E−01 | −4.6915E+01 | −1.8811E+01 |
| A4 = | −1.6287E−01 | −1.5250E−01 | 2.8305E−02 | −3.4961E−01 | −2.8562E−01 |
| A6 = | 2.2402E−01 | 1.4511E−01 | −1.5401E−01 | 9.6316E−02 | 1.5556E−01 |
| A8 = | −1.2876E−01 | −6.9160E−02 | 2.8518E−01 | 4.0510E−02 | −6.4374E−02 |
| A10 = | 6.1274E−01 | 3.6751E−02 | −2.0157E−01 | −2.4634E−02 | 1.9424E−02 |
| A12 = | −6.2490E−01 | −2.5089E−02 | 6.9513E−02 | 4.6643E−03 | −4.4068E−03 |
| A14 = | 1.8064E−01 | 1.0057E−02 | −1.1654E−02 | −3.5050E−04 | 8.4527E−04 |
| A16 = | | −1.6723E−03 | 7.1842E−04 | 1.1138E−05 | −7.7575E−05 |

In the 2nd embodiment, the equation of the aspheric surface profiles of the aforementioned lens elements is the same as the equation of the 1st embodiment. Also, the definitions of these parameters shown in Table 5 below are the same as those stated in the 1st embodiment with corresponding values for the 2nd embodiment, so an explanation in this regard will not be provided again.

Moreover, these parameters can be calculated from Table 3 and Table 4 and satisfy the conditions stated in Table 5.

TABLE 5

| 2nd Embodiment | | | |
|---|---|---|---|
| f [mm] | 5.31 | f1/f4 | −0.02 |
| Fno | 2.50 | (|f/f4| + |f/f5|)/(|f/f1| + |f/f2|) | 0.16 |
| HFOV [deg.] | 22.3 | ImgH/(T23 + T34) | 1.84 |
| (V2 + V4)/V1 | 0.83 | f/ImgH | 2.31 |
| (T23 + T34)/ (CT3 + CT4 + CT5) | 1.44 | EPD/ImgH | 0.92 |
| | | SD/TD | 0.89 |
| (CT2 + CT4)/(CT2 − CT4) | 7.51 | f/Yc52 | 8.63 |
| CT4/CT3 | 1.07 | EPD/(SD11*2) | 0.97 |
| (R7 + R8)/(R7 − R8) | −27.85 | | |
| |f/f1| + |f/f2| | 2.86 | | |

3rd Embodiment

Figure 3A:
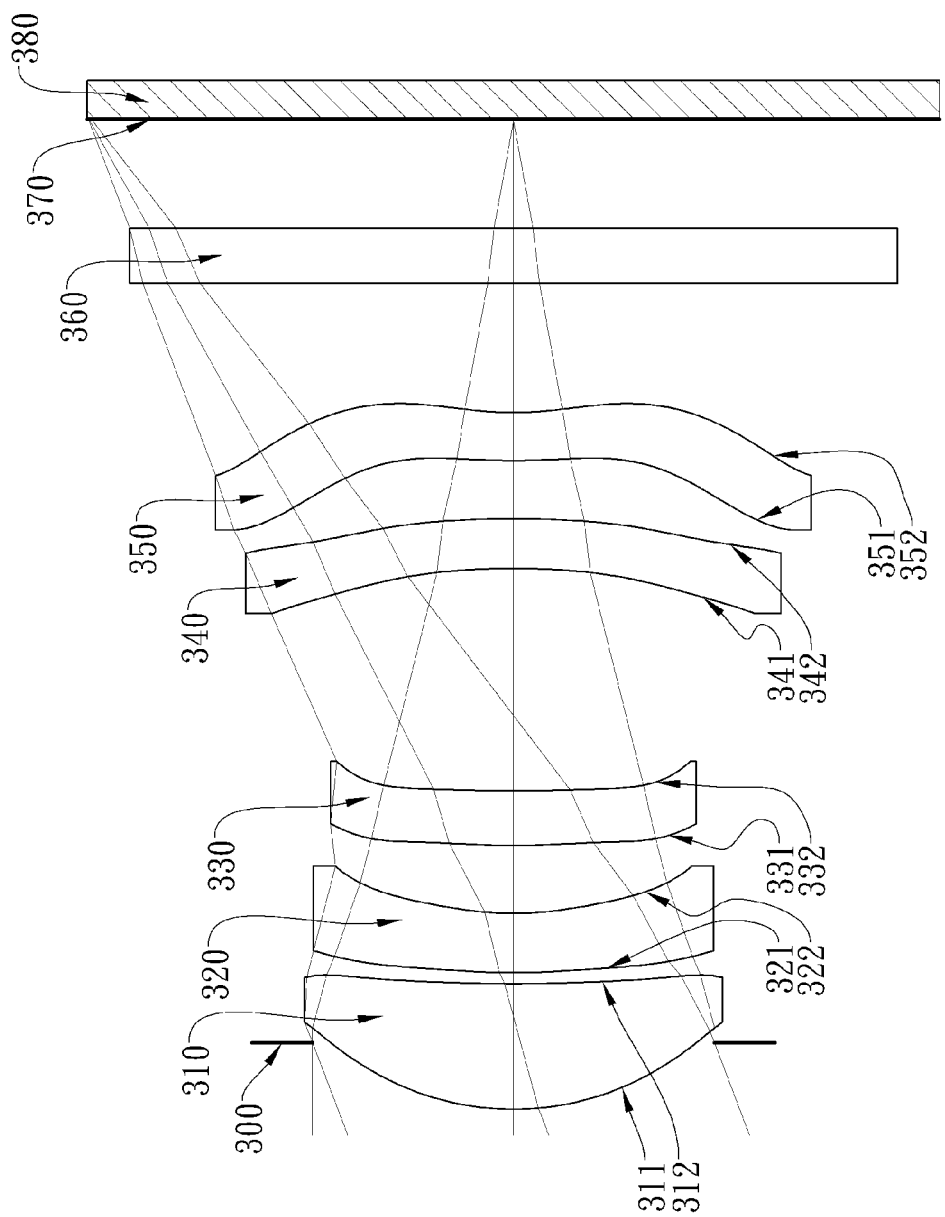
FIG. 3A is a schematic view of an image capturing device according to the third embodiment of the present disclosure.
Figure 3B:
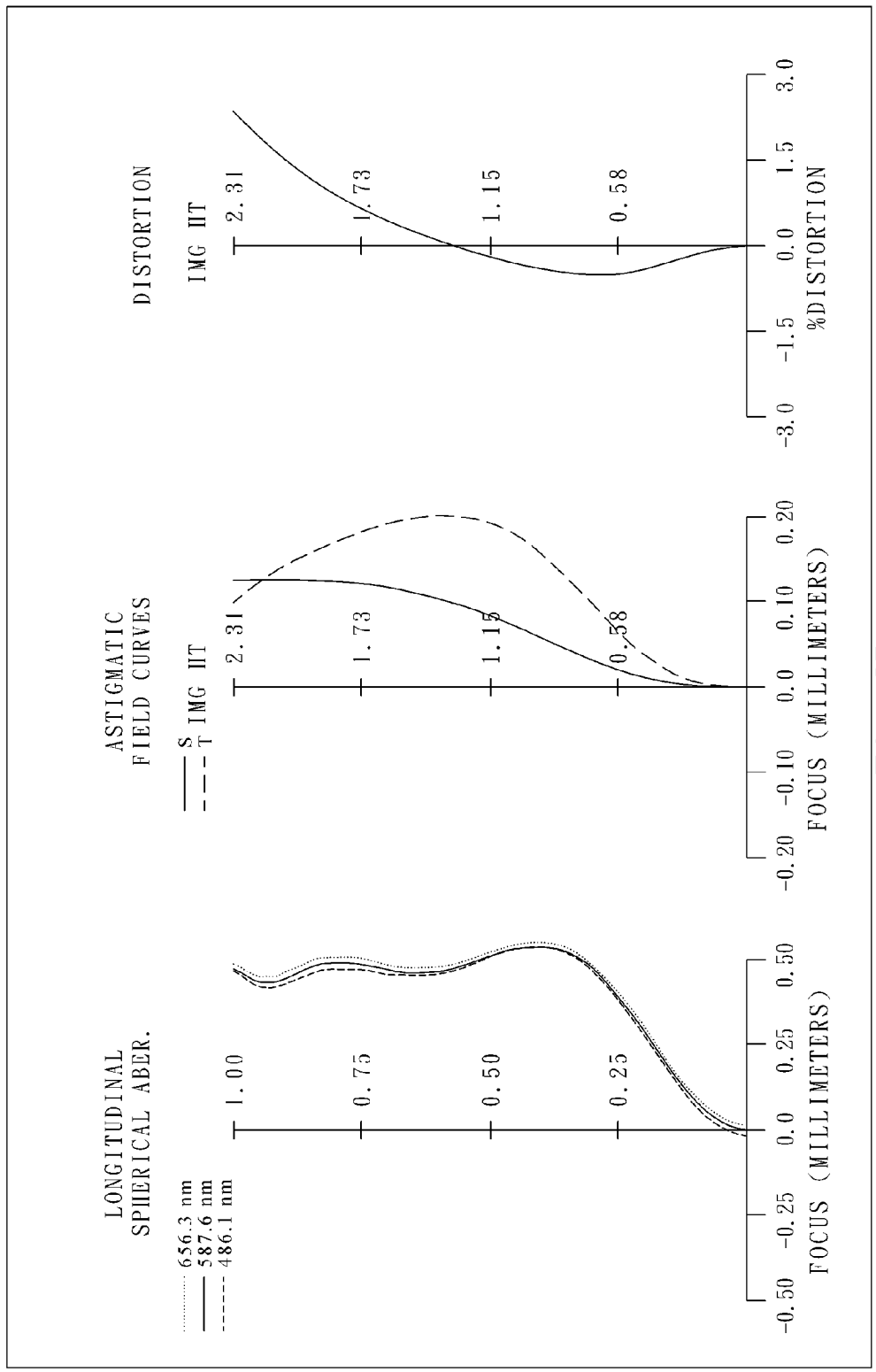
FIG. 3B shows longitudinal spherical aberration curves, astigmatic field curves and a distortion curve of the image capturing device according to the third embodiment.

FIG. 3A is a schematic view of an image capturing device according to the 3rd embodiment of the present disclosure. FIG. 3B shows, in order from left to right, longitudinal spherical aberration curves, astigmatic field curves and a distortion curve of the image capturing device according to the 3rd embodiment.

In FIG. 3A, the image capturing device includes an imaging lens system (not otherwise herein labeled) of the present disclosure and an image sensor 380. The imaging lens system includes, in order from an object side to an image side, a first lens element 310, a second lens element 320, a third lens element 330, a fourth lens element 340, and a fifth lens element 350, wherein the imaging lens system has a total of five lens elements (310-350) with refractive power.

The first lens element 310 with positive refractive power has an object-side surface 311 being convex in a paraxial region thereof and an image-side surface 312 being concave in a paraxial region thereof, which are both aspheric, and the first lens element 310 is made of plastic material.

The second lens element 320 with negative refractive power has an object-side surface 321 being convex in a paraxial region thereof and an image-side surface 322 being concave in a paraxial region thereof, which are both aspheric, and the second lens element 320 is made of plastic material.

The third lens element 330 with positive refractive power has an object-side surface 331 being convex in a paraxial region thereof and an image-side surface 332 being concave in a paraxial region thereof, which are both aspheric, and the third lens element 330 is made of plastic material. Furthermore, the object-side surface 331 of the third lens element 330 has at least one inflection point.

The fourth lens element 340 with negative refractive power has an object-side surface 341 being concave in a paraxial region thereof and an image-side surface 342 being convex in a paraxial region thereof, which are both aspheric, and the fourth lens element 340 is made of plastic material.

The fifth lens element 350 with negative refractive power has an object-side surface 351 being convex in a paraxial region thereof and an image-side surface 352 being concave in a paraxial region thereof, which are both aspheric, and the fifth lens element 350 is made of plastic material. Furthermore, each of the object-side surface 351 and the image-side surface 352 of the fifth lens element 350 has at least one inflection point.

The imaging lens system is further provided with a stop 300 disposed between an imaged object and the first lens element 310, and no lens element with refractive power is disposed between the stop 300 and the first lens element 310. The imaging lens system further includes an IR-cut filter 360 placed between the fifth lens element 350 and an image surface 370. The IR-cut filter 360 is made of glass and will not affect the focal length of the imaging lens system. The image sensor 380 is disposed on or near the image surface 370 of the imaging lens system.

The detailed optical data of the third embodiment are shown in TABLE 6, and the aspheric surface data are shown in TABLE 7, wherein the units of the curvature radius, the thickness and the focal length are expressed in mm, and HFOV is half of the maximal field of view.

TABLE 6

(Embodiment 3)
f = 5.22 mm, Fno = 2.40, HFOV = 20.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.360 | | | | |
| 2 | Lens 1 | 1.520 | ASP | 0.680 | Plastic | 1.544 | 55.9 | 3.34 |
| 3 | | 7.859 | ASP | 0.060 | | | | |
| 4 | Lens 2 | 3.032 | ASP | 0.321 | Plastic | 1.650 | 21.4 | −5.43 |
| 5 | | 1.563 | ASP | 0.369 | | | | |
| 6 | Lens 3 | 3.623 | ASP | 0.297 | Plastic | 1.544 | 55.9 | 12.17 |
| 7 | | 7.766 | ASP | 1.205 | | | | |
| 8 | Lens 4 | −4.351 | ASP | 0.270 | Plastic | 1.544 | 55.9 | −31.45 |
| 9 | | −5.962 | ASP | 0.315 | | | | |
| 10 | Lens 5 | 2.975 | ASP | 0.261 | Plastic | 1.544 | 55.9 | −6.59 |
| 11 | | 1.575 | ASP | 0.700 | | | | |
| 12 | IR-cut filter | Plano | | 0.300 | Glass | 1.517 | 64.2 | — |
| 13 | | Plano | | 0.591 | | | | |
| 14 | Image Surface | Plano | | — | | | | |

Note:
Reference wavelength is d-line 587.6 nm

TABLE 7

Aspheric Coefficients

| | | | Surface # | | |
|---|---|---|---|---|---|
| | 2 | 3 | 4 | 5 | 6 |
| k = | −7.0358E−02 | −9.0000E+01 | −9.0000E+01 | −1.2783E+01 | −7.9246E+01 |
| A4 = | −1.8442E−03 | −5.9923E−02 | −1.1242E−01 | −8.5300E−02 | −2.3414E−01 |
| A6 = | 3.5121E−02 | 1.4357E−01 | 2.0490E−01 | 2.3676E−01 | 5.8001E−01 |
| A8 = | −4.6779E−02 | −8.6956E−02 | 3.4241E−02 | −2.3792E−01 | −1.7756E+00 |
| A10 = | −3.6365E−02 | −2.1416E−02 | −2.5211E−01 | 5.8160E−01 | 4.9068E+00 |
| A12 = | 8.6856E−02 | 4.1759E−02 | 1.9701E−01 | −6.4324E−01 | −6.5886E+00 |
| A14 = | −4.0210E−02 | −1.9235E−02 | −5.2795E−02 | 2.5063E−01 | 4.2473E+00 |
| A16 = | | | | | −1.0888E+00 |

| | | | Surface # | | |
|---|---|---|---|---|---|
| | 7 | 8 | 9 | 10 | 11 |
| k = | 2.0000E+01 | −9.0000E+01 | 4.0663E+00 | −5.8140E+01 | −1.7800E+01 |
| A4 = | −1.5304E−01 | −1.8581E−01 | −1.5258E−02 | −3.4872E−01 | −2.9295E−01 |
| A6 = | 2.5628E−01 | 1.5368E−01 | −1.5172E−01 | 9.6873E−02 | 1.5700E−01 |
| A8 = | −1.2098E−01 | −6.8329E−02 | 2.8669E−01 | 4.0671E−02 | −6.3746E−02 |
| A10 = | 6.0780E−01 | 3.6729E−02 | −2.0132E−01 | −2.4583E−02 | 1.9533E−02 |
| A12 = | −6.3322E−01 | −2.5129E−02 | 6.9497E−02 | 4.6706E−03 | −4.3963E−03 |
| A14 = | 1.7225E−01 | 1.0033E−02 | −1.1683E−02 | −3.5771E−04 | 8.4607E−04 |
| A16 = | | −1.6927E−03 | 7.0435E−04 | 1.1138E−05 | −7.7249E−05 |

In the 3rd embodiment, the equation of the aspheric surface profiles of the aforementioned lens elements is the same as the equation of the 1st embodiment. Also, the definitions of these parameters shown in Table 8 below are the same as those stated in the 1st embodiment with corresponding values for the 3rd embodiment, so an explanation in this regard will not be provided again.

Moreover, these parameters can be calculated from Table 6 and Table 7 and satisfy the conditions stated in Table 8.

TABLE 8

| 3rd Embodiment | | | |
|---|---|---|---|
| f [mm] | 5.22 | f1/f4 | −0.11 |
| Fno | 2.40 | (|f/f4| + |f/f5|)/ | 0.38 |
| HFOV [deg.] | 20.8 | (|f/f1| + |f/f2|) | |

TABLE 8-continued

| 3rd Embodiment | | | |
|---|---|---|---|
| (V2 + V4)/V1 | 1.38 | ImgH/(T23 + T34) | 1.46 |
| (T23 + T34)/(CT3 + CT4 + CT5) | 1.90 | f/ImgH | 2.27 |
| (CT2 + CT4)/(CT2 − CT4) | 11.59 | EPD/ImgH | 0.95 |
| CT4/CT3 | 0.91 | SD/TD | 0.90 |
| (R7 + R8)/(R7 − R8) | −6.40 | f/Yc52 | 8.50 |
| |f/f1| + |f/f2| | 2.53 | EPD/(SD11 * 2) | 0.96 |

4th Embodiment

Figure 4A:
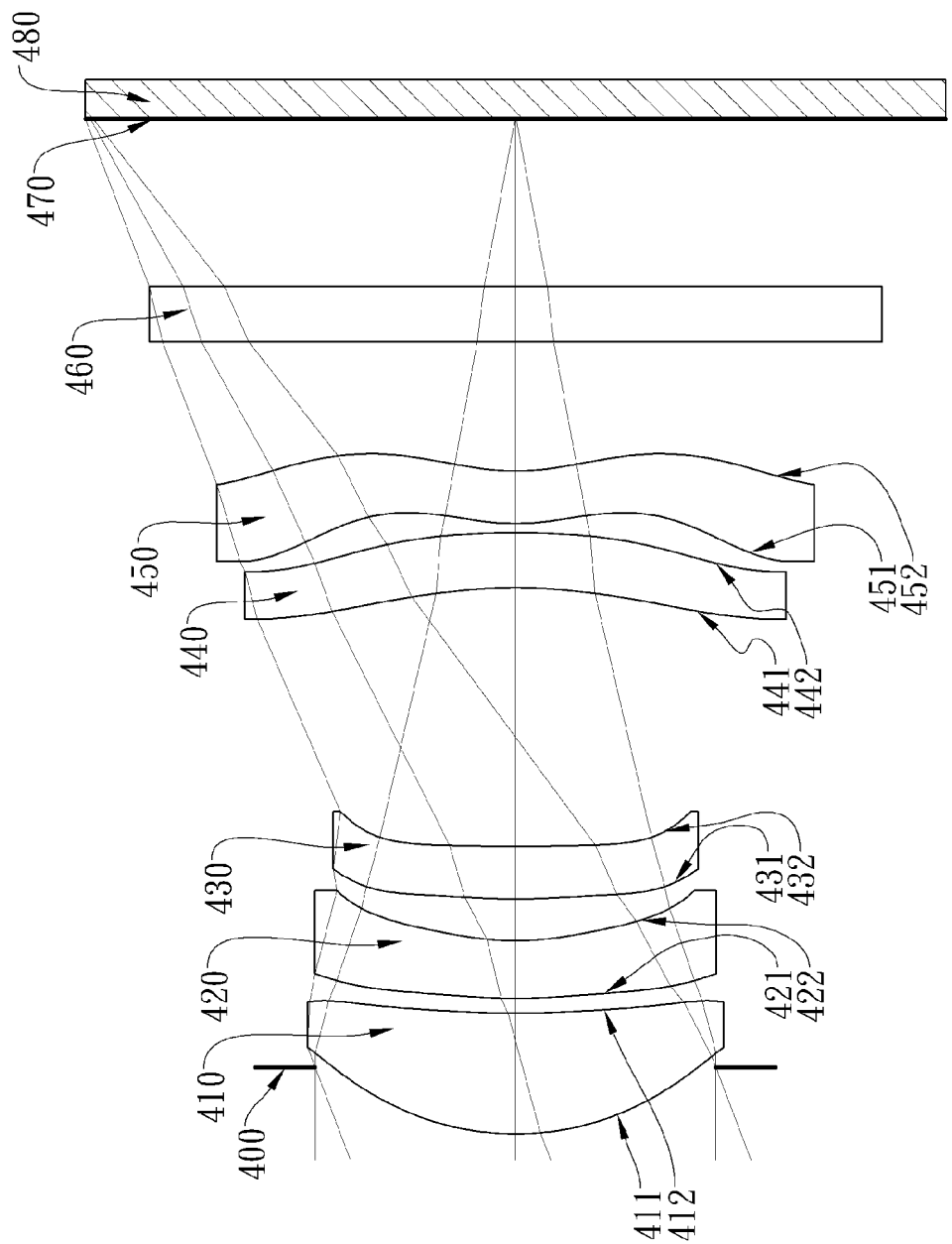
FIG. 4A is a schematic view of an image capturing device according to the fourth embodiment of the present disclosure.
Figure 4B:
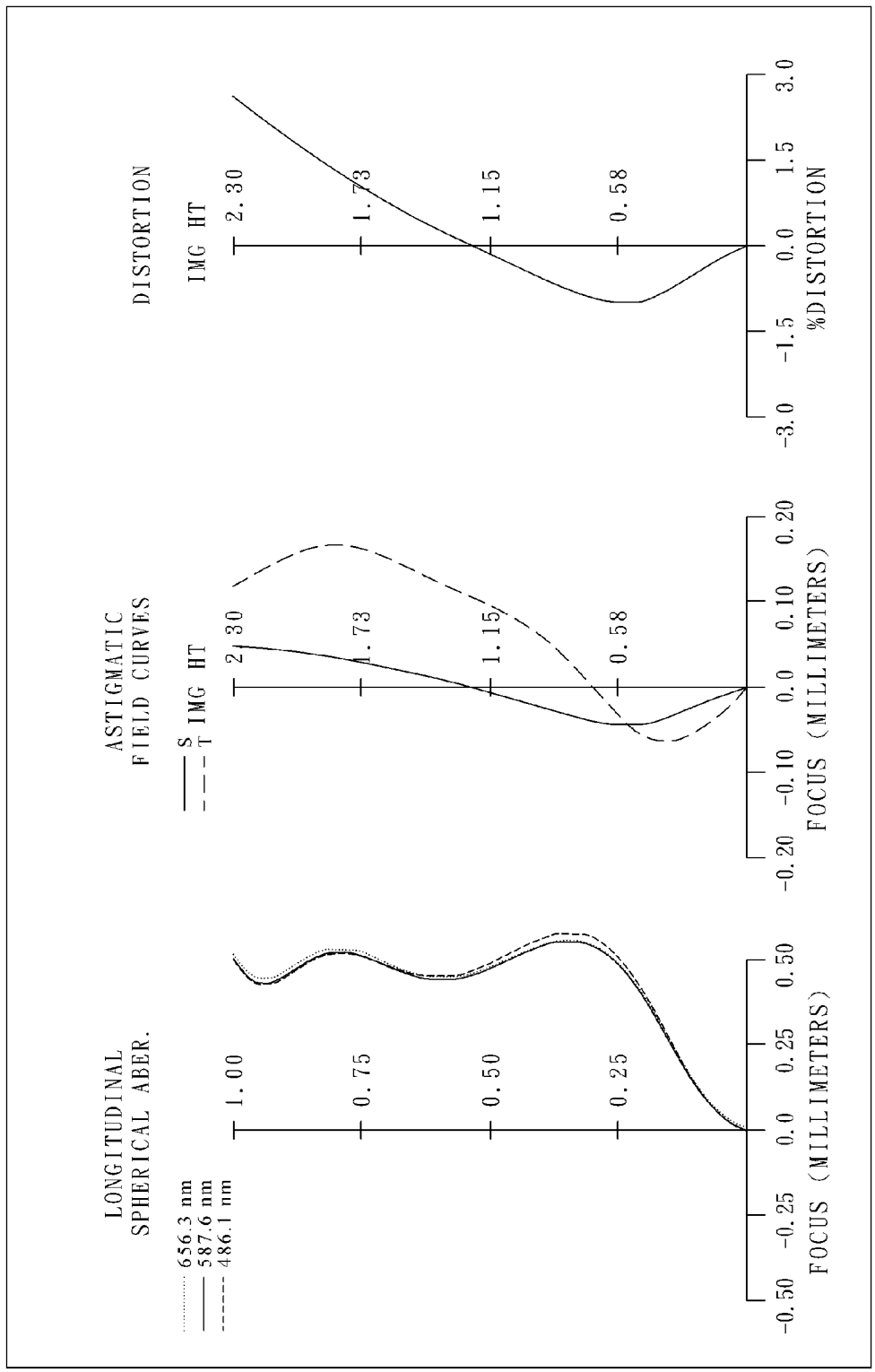
FIG. 4B shows longitudinal spherical aberration curves, astigmatic field curves and a distortion curve of the image capturing device according to the fourth embodiment.

FIG. 4A is a schematic view of an image capturing device according to the 4th embodiment of the present disclosure. FIG. 4B shows, in order from left to right, longitudinal spherical aberration curves, astigmatic field curves and a distortion curve of the image capturing device according to the 4th embodiment.

In FIG. 4A, the image capturing device includes an imaging lens system (not otherwise herein labeled) of the present disclosure and an image sensor 480. The imaging lens system includes, in order from an object side to an image side, a first lens element 410, a second lens element 420, a third lens element 430, a fourth lens element 440, and a fifth lens element 450, wherein the imaging lens system has a total of five lens elements (410-450) with refractive power.

The first lens element 410 with positive refractive power has an object-side surface 411 being convex in a paraxial region thereof and an image-side surface 412 being concave in a paraxial region thereof, which are both aspheric, and the first lens element 410 is made of plastic material.

The second lens element 420 with negative refractive power has an object-side surface 421 being convex in a paraxial region thereof and an image-side surface 422 being concave in a paraxial region thereof, which are both aspheric, and the second lens element 420 is made of plastic material.

The third lens element 430 with positive refractive power has an object-side surface 431 being convex in a paraxial region thereof and an image-side surface 432 being concave in a paraxial region thereof, which are both aspheric, and the third lens element 430 is made of plastic material. Furthermore, the object-side surface 431 of the third lens element 430 has at least one inflection point.

The fourth lens element 440 with negative refractive power has an object-side surface 441 being concave in a paraxial region thereof and an image-side surface 442 being convex in a paraxial region thereof, which are both aspheric, and the fourth lens element 440 is made of plastic material.

The fifth lens element 450 with positive refractive power has an object-side surface 451 being convex in a paraxial region thereof and an image-side surface 452 being concave in a paraxial region thereof, which are both aspheric, and the fifth lens element 450 is made of plastic material. Furthermore, each of the object-side surface 451 and the image-side surface 452 of the fifth lens element 450 has at least one inflection point.

The imaging lens system is further provided with a stop 400 disposed between an imaged object and the first lens element 410, and no lens element with refractive power is disposed between the stop 400 and the first lens element 410. The imaging lens system further includes an IR-cut filter 460 placed between the fifth lens element 450 and an image surface 470. The IR-cut filter 460 is made of glass and will not affect the focal length of the imaging lens system. The image sensor 480 is disposed on or near the image surface 470 of the imaging lens system.

The detailed optical data of the fourth embodiment are shown in TABLE 9, and the aspheric surface data are shown in TABLE 10, wherein the units of the curvature radius, the thickness and the focal length are expressed in mm, and HFOV is half of the maximal field of view.

TABLE 9

(Embodiment 4)
f = 5.20 mm, Fno = 2.40, HFOV = 20.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.360 | | | | |
| 2 | Lens 1 | 1.492 | ASP | 0.654 | Plastic | 1.544 | 55.9 | 3.74 |
| 3 | | 4.712 | ASP | 0.079 | | | | |
| 4 | Lens 2 | 2.387 | ASP | 0.312 | Plastic | 1.650 | 21.4 | −5.14 |
| 5 | | 1.320 | ASP | 0.227 | | | | |
| 6 | Lens 3 | 3.179 | ASP | 0.285 | Plastic | 1.544 | 55.9 | 7.61 |
| 7 | | 13.282 | ASP | 1.401 | | | | |
| 8 | Lens 4 | −2.056 | ASP | 0.297 | Plastic | 1.650 | 21.4 | −5.70 |
| 9 | | −4.887 | ASP | 0.050 | | | | |
| 10 | Lens 5 | 1.144 | ASP | 0.284 | Plastic | 1.544 | 55.9 | 16.22 |
| 11 | | 1.200 | ASP | 0.700 | | | | |
| 12 | IR-cut filter | Plano | | 0.300 | Glass | 1.517 | 64.2 | |
| 13 | | Plano | | 0.906 | | | | |
| 14 | Image Surface | Plano | | — | | | | |

Note:
Reference wavelength is d-line 587.6 nm

TABLE 10

Aspheric Coefficients

| Surface # | 2 | 3 | 4 | 5 | 6 |
|---|---|---|---|---|---|
| k = | −8.3911E−02 | −8.7787E+01 | −8.3262E+01 | −1.3827E+01 | −6.5265E+01 |
| A4 = | −6.1789E−03 | −5.9424E−02 | −1.1527E−01 | −9.4107E−02 | −2.2298E−01 |
| A6 = | 3.6432E−02 | 1.4478E−01 | 2.0475E−01 | 2.4428E−01 | 6.2532E−01 |
| A8 = | −4.7938E−02 | −8.6875E−02 | 3.6476E−01 | −2.3364E−01 | −1.7790E+00 |
| A10 = | −3.7276E−02 | −2.1384E−02 | −2.5037E−01 | 5.8532E−01 | 4.8948E+00 |
| A12 = | 8.6554E−02 | 4.1936E−02 | 1.9799E−01 | −6.4047E−01 | −6.5954E+00 |
| A14 = | −4.0111E−02 | −1.8959E−02 | −5.2343E−02 | 2.5172E−01 | 4.2473E+00 |
| A16 = | | | | | −1.0837E+00 |

| Surface # | 7 | 8 | 9 | 10 | 11 |
|---|---|---|---|---|---|
| k = | 1.5252E+01 | −9.0000E+01 | 5.2074E+00 | −1.4207E+01 | −9.3213E+00 |
| A4 = | −4.2058E−02 | −1.4185E−01 | −3.1417E−02 | −3.6006E−01 | −2.6217E−01 |

TABLE 10-continued

| Aspheric Coefficients | | | | | |
|---|---|---|---|---|---|
| A6 = | 2.3473E−01 | 1.4770E−01 | −1.4835E−01 | 1.0035E−01 | 1.5495E−01 |
| A8 = | −1.2220E−01 | −7.1222E−02 | 2.8899E−01 | 4.1388E−02 | −6.3224E−02 |
| A10 = | 6.0987E−01 | 3.6518E−02 | −2.0081E−01 | −2.4515E−02 | 1.9655E−02 |
| A12 = | −6.3790E−01 | −2.4836E−02 | 6.9587E−02 | 4.6319E−03 | −4.4262E−03 |
| A14 = | 1.5873E−01 | 1.0243E−02 | −1.1663E−02 | −3.9559E−04 | 8.1555E−04 |
| A16 = | | −1.5936E−03 | 7.1571E−04 | 1.1138E−05 | −9.1603E−05 |

In the 4th embodiment, the equation of the aspheric surface profiles of the aforementioned lens elements is the same as the equation of the 1st embodiment. Also, the definitions of these parameters shown in Table 11 below are the same as those stated in the 1st embodiment with corresponding values for the 4th embodiment, so an explanation in this regard will not be provided again.

Moreover, these parameters can be calculated from Table 9 and Table 10 and satisfy the conditions stated in Table 11.

TABLE 11

| 4th Embodiment | | | |
|---|---|---|---|
| f [mm] | 5.20 | f1/f4 | −0.66 |
| Fno | 2.40 | (\|f/f4\| + \|f/f5\|)/ | 0.51 |
| HFOV [deg.] | 20.8 | (\|f/f1\| + \|f/f2\|) | |
| (V2 + V4)/V1 | 0.77 | ImgH/(T23 + T34) | 1.41 |
| (T23 + T34)/(CT3 + CT4 + CT5) | 1.88 | f/ImgH | 2.26 |
| (CT2 + CT4)/(CT2 − CT4) | 40.60 | EPD/ImgH | 0.94 |
| CT4/CT3 | 1.04 | SD/TD | 0.90 |
| (R7 + R8)/(R7 − R8) | −2.45 | f/Yc52 | 6.63 |
| \|f/f1\| + \|f/f2\| | 2.40 | EPD/(SD11 * 2) | 0.96 |

5th Embodiment

Figure 5A:
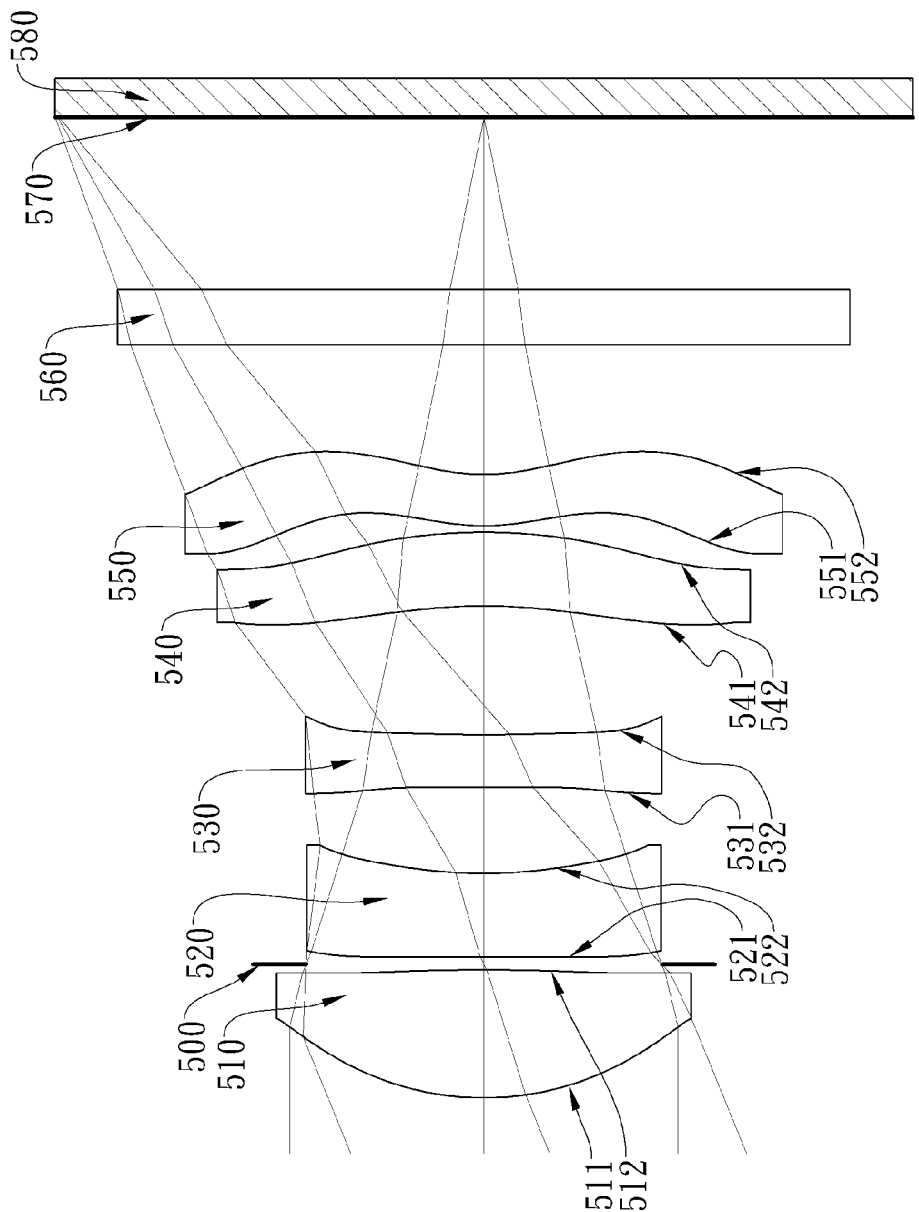
FIG. 5A is a schematic view of an image capturing device according to the fifth embodiment of the present disclosure.
Figure 5B:
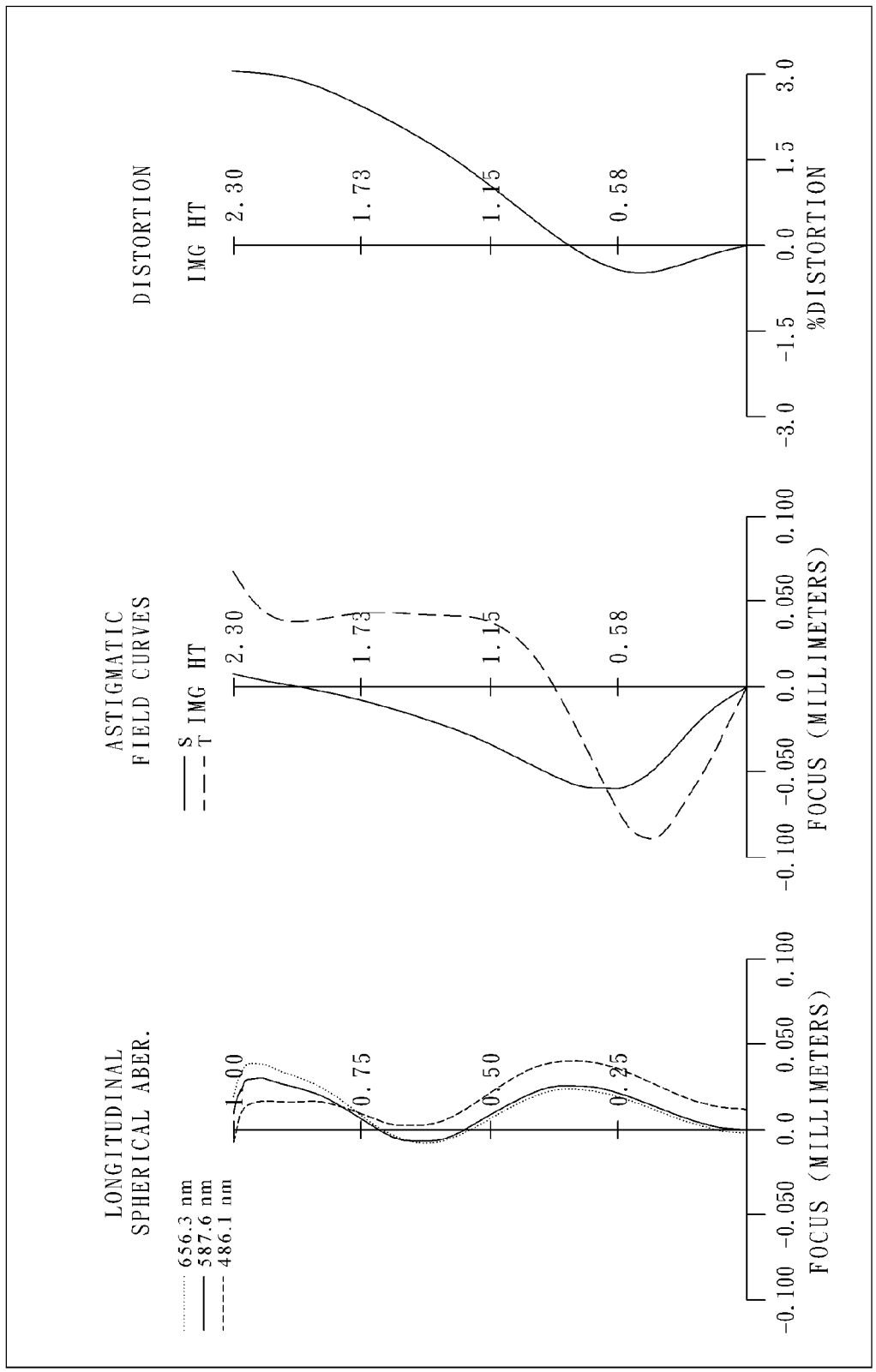
FIG. 5B shows longitudinal spherical aberration curves, astigmatic field curves and a distortion curve of the image capturing device according to the fifth embodiment.

FIG. 5A is a schematic view of an image capturing device according to the 5th embodiment of the present disclosure. FIG. 5B shows, in order from left to right, longitudinal spherical aberration curves, astigmatic field curves and a distortion curve of the image capturing device according to the 5th embodiment.

In FIG. 5A, the image capturing device includes an imaging lens system (not otherwise herein labeled) of the present disclosure and an image sensor 580. The imaging lens system includes, in order from an object side to an image side, a first lens element 510, a second lens element 520, a third lens element 530, a fourth lens element 540, and a fifth lens element 550, wherein the imaging lens system has a total of five lens elements (510-550) with refractive power.

The first lens element 510 with positive refractive power has an object-side surface 511 being convex in a paraxial region thereof and an image-side surface 512 being convex in a paraxial region thereof, which are both aspheric, and the first lens element 510 is made of plastic material.

The second lens element 520 with negative refractive power has an object-side surface 521 being convex in a paraxial region thereof and an image-side surface 522 being concave in a paraxial region thereof, which are both aspheric, and the second lens element 520 is made of plastic material.

The third lens element 530 with negative refractive power has an object-side surface 531 being convex in a paraxial region thereof and an image-side surface 532 being concave in a paraxial region thereof, which are both aspheric, and the third lens element 530 is made of plastic material. Furthermore, each of the object-side surface 531 and the image-side surface 532 of the third lens element 530 has at least one inflection point.

The fourth lens element 540 with negative refractive power has an object-side surface 541 being concave in a paraxial region thereof and an image-side surface 542 being convex in a paraxial region thereof, which are both aspheric, and the fourth lens element 540 is made of plastic material.

The fifth lens element 550 with positive refractive power has an object-side surface 551 being convex in a paraxial region thereof and an image-side surface 552 being concave in a paraxial region thereof, which are both aspheric, and the fifth lens element 550 is made of plastic material. Furthermore, each of the object-side surface 551 and the image-side surface 552 of the fifth lens element 550 has at least one inflection point.

The imaging lens system is further provided with a stop 500 disposed between the first lens element 510 and the second lens element 520, and no lens element with refractive power is disposed between the stop 500 and the first lens element 510. The imaging lens system further includes an IR-cut filter 560 placed between the fifth lens element 550 and an image surface 570. The IR-cut filter 560 is made of glass and will not affect the focal length of the imaging lens system. The image sensor 580 is disposed on or near the image surface 570 of the imaging lens system.

The detailed optical data of the fifth embodiment are shown in TABLE 12, and the aspheric surface data are shown in TABLE 13, wherein the units of the curvature radius, the thickness and the focal length are expressed in mm, and HFOV is half of the maximal field of view.

TABLE 12

(Embodiment 5)
f = 5.45 mm, Fno = 2.60, HFOV = 22.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.555 | ASP | 0.691 | Plastic | 1.544 | 55.9 | 2.58 |
| 2 | | −12.292 | ASP | 0.030 | | | | |
| 3 | Stop | Plano | | 0.038 | | | | |
| 4 | Lens 2 | 25.602 | ASP | 0.453 | Plastic | 1.640 | 23.3 | −3.99 |
| 5 | | 2.303 | ASP | 0.464 | | | | |
| 6 | Lens 3 | 10.423 | ASP | 0.285 | Plastic | 1.640 | 23.3 | −40.69 |

TABLE 12-continued (Embodiment 5)
f = 5.45 mm, Fno = 2.60, HFOV = 22.2 deg.

| Surface # | | Curvature Radius | Thickness | Material | Index | Abbe # | Focal Length |
|---|---|---|---|---|---|---|---|
| 7 | | 7.364 ASP | 0.697 | | | | |
| 8 | Lens 4 | −2.296 ASP | 0.397 | Plastic | 1.640 | 55.8 | −18.41 |
| 9 | | −3.045 ASP | 0.035 | | | | |
| 10 | Lens 5 | 1.143 ASP | 0.277 | Plastic | 1.530 | 64.2 | 419.32 |
| 11 | | 1.052 ASP | 0.700 | | | | |
| 12 | IR-cut filter | Plano | 0.300 | Plastic | 1.517 | — | |
| 13 | | Plano | 0.930 | | | | |
| 14 | Image Surface | Plano | — | | | | |

Note:
Reference wavelength is d-line 587.6 nm

TABLE 13

Aspheric Coefficients

| Surface # | 1 | 2 | 4 | 5 | 6 |
|---|---|---|---|---|---|
| k = | −7.0607E−02 | −9.0000E+01 | −9.0000E+01 | −9.5894E+00 | −1.6168E+01 |
| A4 = | −1.8074E−02 | −4.4797E−02 | −1.1297E−01 | −9.8813E−02 | −3.3120E−01 |
| A6 = | 4.5793E−02 | 1.4916E−01 | 2.0929E−01 | 2.0368E−01 | 5.6082E−01 |
| A8 = | −4.3725E−02 | −8.3454E−02 | 3.6529E−02 | −2.5154E−01 | −1.7866E+00 |
| A10 = | −3.9741E−02 | −2.1656E−02 | −2.5008E−01 | 5.8187E−01 | 4.9038E+00 |
| A12 = | 8.3236E−02 | 3.9725E−02 | 1.9812E−01 | −6.3252E−01 | −6.5868E+00 |
| A14 = | −3.9467E−02 | −2.0521E−02 | −5.3635E−02 | 2.7378E−01 | 4.2475E+00 |
| A16 = | | | | | −1.0962E+00 |

| Surface # | 7 | 8 | 9 | 10 | 11 |
|---|---|---|---|---|---|
| k = | 9.1633E+00 | −9.0000E+01 | 7.6147E−01 | −9.7891E+00 | −6.0318E+00 |
| A4 = | −1.6747E−01 | −1.0782E−01 | 2.2250E−02 | −3.5220E−01 | −2.7516E−01 |
| A6 = | 2.1723E−01 | 1.4456E−01 | −1.4888E−01 | 9.7831E−02 | 1.5583E−01 |
| A8 = | −1.4581E−01 | −7.1287E−02 | 2.8522E−01 | 4.0737E−02 | −6.5002E−02 |
| A10 = | 5.9995E−01 | 3.5977E−02 | −2.0153E−01 | −2.4635E−02 | 1.9346E−02 |
| A12 = | −6.3156E−01 | −2.5216E−02 | 6.9552E−02 | 4.6343E−03 | −4.4485E−03 |
| A14 = | 1.7956E−01 | 1.0184E−02 | −1.1625E−02 | −3.6803E−04 | 8.4115E−04 |
| A16 = | | −1.4878E−03 | 7.3728E−04 | 1.1138E−05 | −7.4558E−05 |

In the 5th embodiment, the equation of the aspheric surface profiles of the aforementioned lens elements is the same as the equation of the 1st embodiment. Also, the definitions of these parameters shown in Table 14 below are the same as those stated in the 1st embodiment with corresponding values for the 5th embodiment, so an explanation in this regard will not be provided again.

Moreover, these parameters can be calculated from Table 12 and Table 13 and satisfy the conditions stated in Table 14.

TABLE 14

5th Embodiment

| | | | |
|---|---|---|---|
| f [mm] | 5.45 | f1/f4 | −0.14 |
| Fno | 2.60 | (\|f/f4\| + \|f/f5\|)/ | 1.98 |
| HFOV [deg.] | 22.2 | (\|f/f1\| + \|f/f2\|) | |
| (V2 + V4)/V1 | 0.83 | ImgH/(T23 + T34) | 2.37 |
| (T23 + T34)/(CT3 + CT4 + CT5) | 1.21 | f/ImgH | 0.91 |
| (CT2 + CT4)/(CT2 − CT4) | 15.18 | EPD/ImgH | 0.79 |
| CT4/CT3 | 1.39 | SD/TD | 6.45 |
| (R7 + R8)/(R7 − R8) | −7.13 | f/Yc52 | 0.94 |
| \|f/f1\| + \|f/f2\| | 3.48 | EPD/(SD11 * 2) | |

6th Embodiment

Figure 6A:
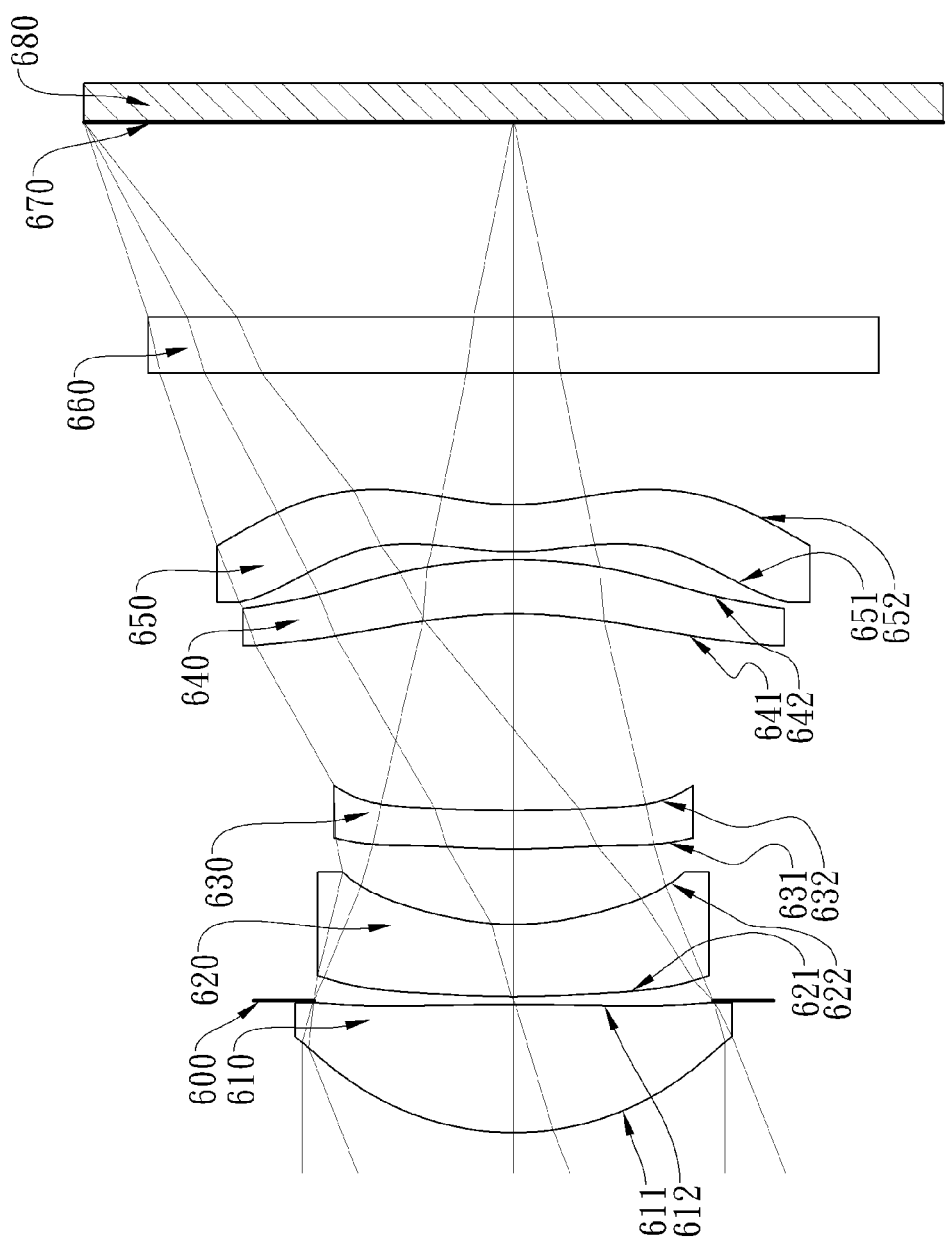
FIG. 6A is a schematic view of an image capturing device according to the sixth embodiment of the present disclosure.
Figure 6B:
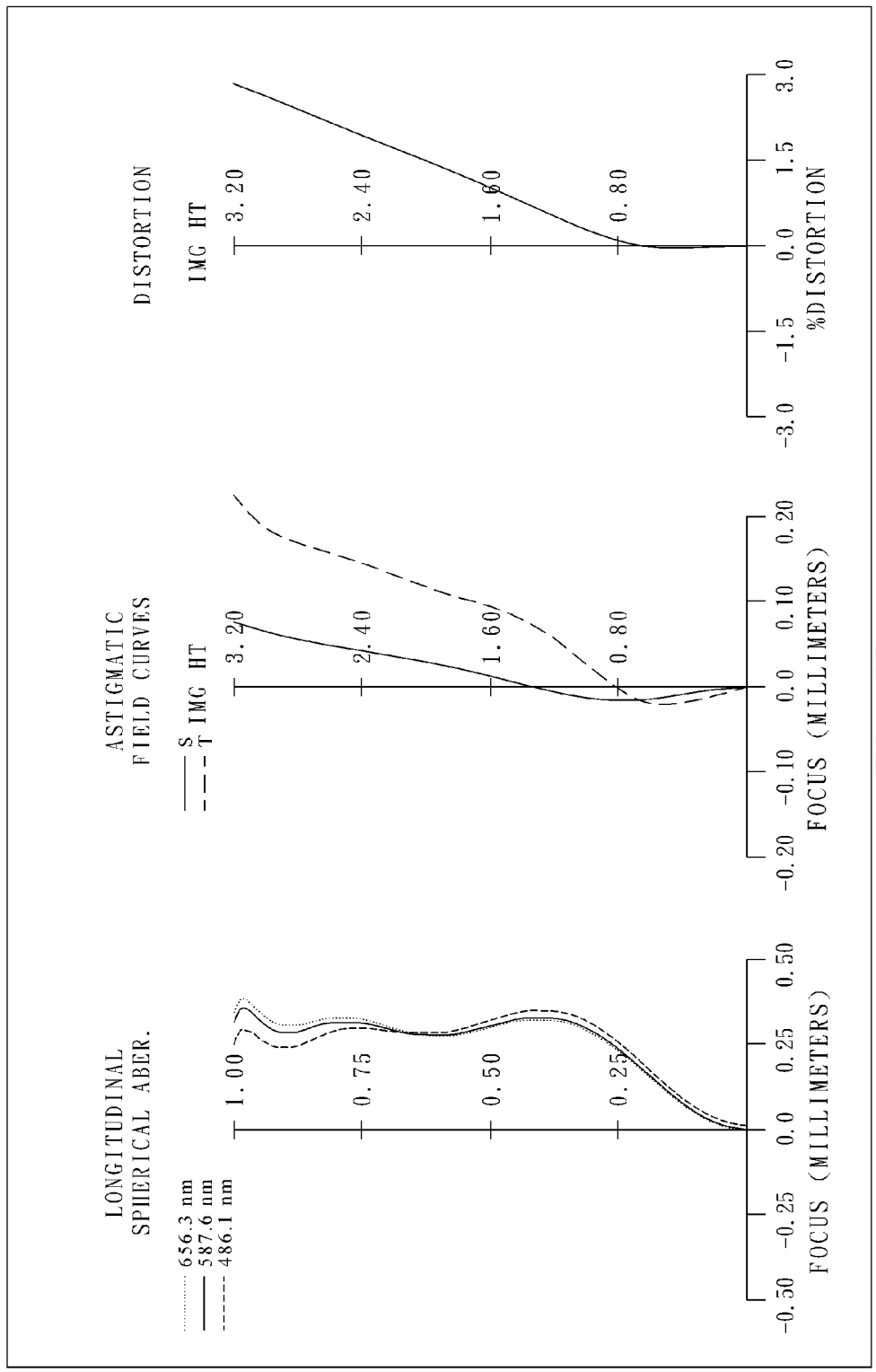
FIG. 6B shows longitudinal spherical aberration curves, astigmatic field curves and a distortion curve of the image capturing device according to the sixth embodiment.

FIG. 6A is a schematic view of an image capturing device according to the 6th embodiment of the present disclosure. FIG. 6B shows, in order from left to right, longitudinal spherical aberration curves, astigmatic field curves and a distortion curve of the image capturing device according to the 6th embodiment.

In FIG. 6A, the image capturing device includes an imaging lens system (not otherwise herein labeled) of the present disclosure and an image sensor 680. The imaging lens system includes, in order from an object side to an image side, a first lens element 610, a second lens element 620, a third lens element 630, a fourth lens element 640, and a fifth lens element 650, wherein the imaging lens system has a total of five lens elements (610-650) with refractive power.

The first lens element 610 with positive refractive power has an object-side surface 611 being convex in a paraxial region thereof and an image-side surface 612 being convex in a paraxial region thereof, which are both aspheric, and the first lens element 610 is made of plastic material.

The second lens element 620 with negative refractive power has an object-side surface 621 being convex in a paraxial region thereof and an image-side surface 622 being concave in a paraxial region thereof, which are both aspheric, and the second lens element 620 is made of plastic material.

The third lens element 630 with positive refractive power has an object-side surface 631 being convex in a paraxial region thereof and an image-side surface 632 being concave in a paraxial region thereof, which are both aspheric, and the third lens element 630 is made of plastic material. Furthermore, the object-side surface 631 of the third lens element 630 has at least one inflection point.

The fourth lens element 640 with negative refractive power has an object-side surface 641 being concave in a paraxial region thereof and an image-side surface 642 being convex in a paraxial region thereof, which are both aspheric, and the fourth lens element 640 is made of plastic material.

The fifth lens element 650 with negative refractive power has an object-side surface 651 being convex in a paraxial region thereof and an image-side surface 652 being concave in a paraxial region thereof, which are both aspheric, and the fifth lens element 650 is made of plastic material. Furthermore, each of the object-side surface 651 and the image-side surface 652 of the fifth lens element 650 has at least one inflection point.

The imaging lens system is further provided with a stop 600 disposed between the first lens element 610 and the second lens element 620, and no lens element with refractive power is disposed between the stop 600 and the first lens element 610. The imaging lens system further includes an IR-cut filter 660 placed between the fifth lens element 650 and an image surface 670. The IR-cut filter 660 is made of glass and will not affect the focal length of the imaging lens system. The image sensor 680 is disposed on or near the image surface 670 of the imaging lens system.

The detailed optical data of the sixth embodiment are shown in TABLE 15, and the aspheric surface data are shown in TABLE 16, wherein the units of the curvature radius, the thickness and the focal length are expressed in mm, and HFOV is half of the maximal field of view.

TABLE 15

(Embodiment 6)
f = 7.58 mm, Fno = 2.40, HFOV = 21.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.108 | ASP | 0.956 | Plastic | 1.535 | 55.7 | 3.75 |
| 2 | | −34.635 | ASP | 0.030 | | | | |
| 3 | Stop | Plano | | 0.030 | | | | |
| 4 | Lens 2 | 5.884 | ASP | 0.539 | Plastic | 1.640 | 23.3 | −4.73 |
| 5 | | 1.927 | ASP | 0.565 | | | | |
| 6 | Lens 3 | 5.501 | ASP | 0.285 | Plastic | 1.535 | 55.7 | 31.34 |
| 7 | | 8.040 | ASP | 1.472 | | | | |
| 8 | Lens 4 | −3.297 | ASP | 0.403 | Plastic | 1.640 | 23.3 | −44.84 |
| 9 | | −3.903 | ASP | 0.059 | | | | |
| 10 | Lens 5 | 2.083 | ASP | 0.353 | Plastic | 1.535 | 55.7 | −70.77 |
| 11 | | 1.858 | ASP | 0.980 | | | | |
| 12 | IR-cut filter | Plano | | 0.420 | Glass | 1.517 | 64.2 | — |
| 13 | | Plano | | 1.458 | | | | |
| 14 | Image Surface | Plano | | — | | | | |

Note:
Reference wavelength is d-line 587.6 nm

TABLE 16

Aspheric Coefficients

| Surface # | 1 | 2 | 4 | 5 | 6 |
|---|---|---|---|---|---|
| k = | −4.0994E−02 | −2.1565E+01 | −9.0000E+01 | −5.2674E+00 | 8.0236E+00 |
| A4 = | −4.6811E−03 | −1.6299E−02 | −4.0707E−02 | −3.0939E−02 | −1.2569E−01 |
| A6 = | 8.5275E−03 | 2.8255E−02 | 3.8704E−02 | 4.0946E−02 | 1.0357E−01 |
| A8 = | −4.2634E−03 | −7.7794E−03 | 3.5062E−03 | −2.2620E−02 | −1.6938E−01 |
| A10 = | −1.9255E−03 | −1.0220E−03 | −1.2037E−02 | 2.8417E−02 | 2.3769E−01 |
| A12 = | 2.0855E−03 | 1.0064E−03 | 4.9111E−03 | −1.5533E−02 | −1.6243E−01 |
| A14 = | −4.6972E−04 | −2.2863E−04 | −6.8378E−04 | 3.5441E−03 | 5.3596E−02 |
| A16 = | | | | | −7.0428E−03 |

| Surface # | 7 | 8 | 9 | 10 | 11 |
|---|---|---|---|---|---|
| k = | 1.9244E+01 | −6.0379E+01 | 8.0424E−01 | −1.5981E+01 | −8.5873E+00 |
| A4 = | −6.0801E−02 | −4.4151E−02 | 8.7878E−03 | −1.3034E−01 | −1.0389E−01 |
| A6 = | 4.1353E−02 | 2.6590E−02 | −2.7771E−02 | 1.8108E−02 | 2.9122E−02 |
| A8 = | −1.3744E−02 | −6.7969E−03 | 2.6995E−02 | 3.8575E−03 | −6.1082E−03 |
| A10 = | 2.8977E−02 | 1.7432E−03 | −9.7559E−03 | −1.1921E−03 | 9.4627E−04 |
| A12 = | −1.5618E−02 | −6.2242E−04 | 1.7176E−03 | 1.1470E−04 | −1.0938E−04 |
| A14 = | 2.2697E−03 | 1.2829E−04 | −1.4637E−04 | −4.5534E−06 | 1.0332E−05 |
| A16 = | | −9.5697E−06 | 4.7594E−06 | 7.1598E−08 | −5.1432E−07 |

In the 6th embodiment, the equation of the aspheric surface profiles of the aforementioned lens elements is the same as the equation of the 1st embodiment. Also, the definitions of these parameters shown in Table 17 below are the same as those stated in the 1st embodiment with corresponding values for the 6th embodiment, so an explanation in this regard will not be provided again.

Moreover, these parameters can be calculated from Table 15 and Table 16 and satisfy the conditions stated in Table 17.

TABLE 17

$6^{th}$ Embodiment

| | | | |
|---|---|---|---|
| f [mm] | 7.58 | f1/f4 | −0.08 |
| Fno | 2.40 | (|f/f4| + |f/f5|)/ | 0.08 |
| HFOV [deg.] | 21.3 | (|f/f1| + |f/f2|) | |
| (V2 + V4)/V1 | 0.83 | ImgH/(T23 + T34) | 1.57 |
| (T23 + T34)/(CT3 + CT4 + CT5) | 1.96 | f/ImgH | 2.37 |
| (CT2 + CT4)/(CT2 − CT4) | 6.93 | EPD/ImgH | 0.99 |
| CT4/CT3 | 1.41 | SD/TD | 0.79 |
| (R7 + R8)/(R7 − R8) | −11.89 | f/Yc52 | 7.32 |
| |f/f1| + |f/f2| | 3.62 | EPD/(SD11 * 2) | 0.97 |

7th Embodiment

Figure 7A:
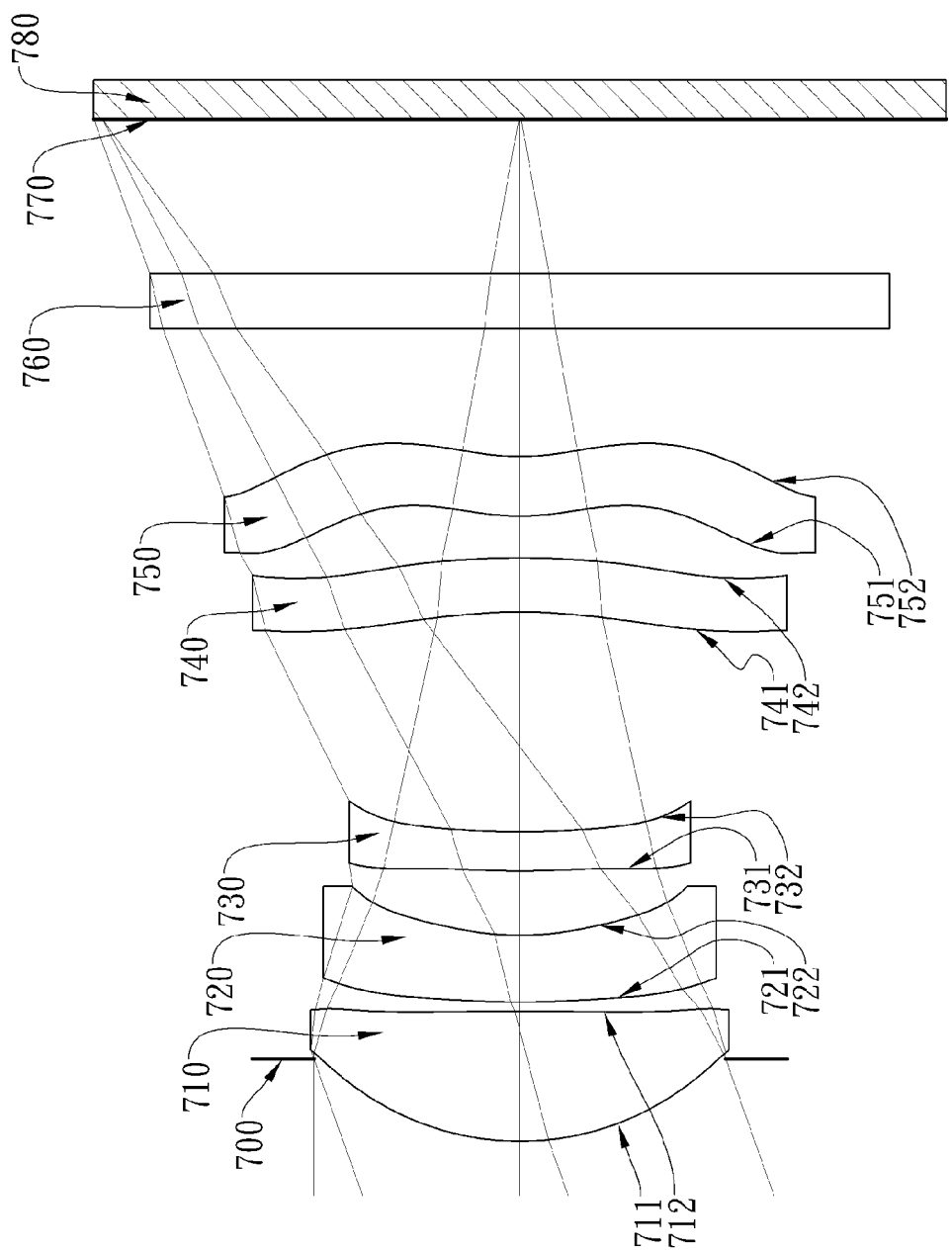
FIG. 7A is a schematic view of an image capturing device according to the seventh embodiment of the present disclosure.
Figure 7B:
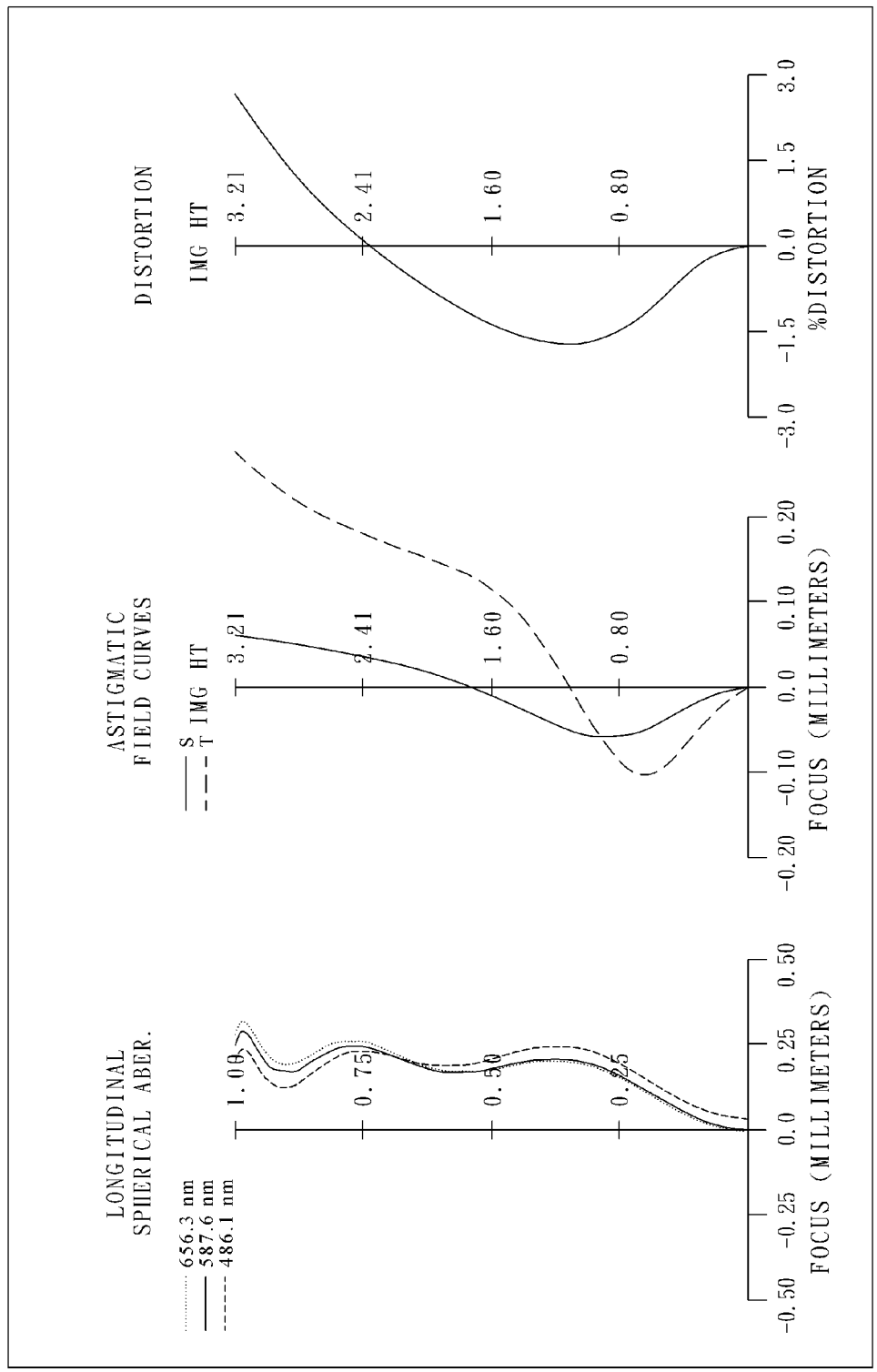
FIG. 7B shows longitudinal spherical aberration curves, astigmatic field curves and a distortion curve of the image capturing device according to the seventh embodiment.

FIG. 7A is a schematic view of an image capturing device according to the 7th embodiment of the present disclosure. FIG. 7B shows, in order from left to right, longitudinal spherical aberration curves, astigmatic field curves and a distortion curve of the image capturing device according to the 7th embodiment.

In FIG. 7A, the image capturing device includes an imaging lens system (not otherwise herein labeled) of the present disclosure and an image sensor 780. The imaging lens system includes, in order from an object side to an image side, a first lens element 710, a second lens element 720, a third lens element 730, a fourth lens element 740, and a fifth lens element 750, wherein the imaging lens system has a total of five lens elements (710-750) with refractive power.

The first lens element 710 with positive refractive power has an object-side surface 711 being convex in a paraxial region thereof and an image-side surface 712 being convex in a paraxial region thereof, which are both aspheric, and the first lens element 710 is made of glass.

The second lens element 720 with negative refractive power has an object-side surface 721 being convex in a paraxial region thereof and an image-side surface 722 being concave in a paraxial region thereof, which are both aspheric, and the second lens element 720 is made of plastic material.

The third lens element 730 with positive refractive power has an object-side surface 731 being convex in a paraxial region thereof and an image-side surface 732 being concave in a paraxial region thereof, which are both aspheric, and the third lens element 730 is made of plastic material. Furthermore, the object-side surface 731 of the third lens element 730 has at least one inflection point.

The fourth lens element 740 with negative refractive power has an object-side surface 741 being concave in a paraxial region thereof and an image-side surface 742 being convex in a paraxial region thereof, which are both aspheric, and the fourth lens element 740 is made of plastic material.

The fifth lens element 750 with positive refractive power has an object-side surface 751 being convex in a paraxial region thereof and an image-side surface 752 being concave in a paraxial region thereof, which are both aspheric, and the fifth lens element 750 is made of plastic material. Furthermore, each of the object-side surface 751 and the image-side surface 752 of the fifth lens element 750 has at least one inflection point.

The imaging lens system is further provided with a stop 700 disposed between an imaged object and the first lens element 710, and no lens element with refractive power is disposed between the stop 700 and the first lens element 710. The imaging lens system further includes an IR-cut filter 760 placed between the fifth lens element 750 and an image surface 770. The IR-cut filter 760 is made of glass and will not affect the focal length of the imaging lens system. The image sensor 780 is disposed on or near the image surface 770 of the imaging lens system.

The detailed optical data of the seventh embodiment are shown in TABLE 18, and the aspheric surface data are shown in TABLE 19, wherein the units of the curvature radius, the thickness and the focal length are expressed in mm, and HFOV is half of the maximal field of view.

TABLE 18

(Embodiment 7)
f = 8.51 mm, Fno = 2.70, HFOV = 19.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.630 | | | | |
| 2 | Lens 1 | 2.109 | ASP | 0.996 | Glass | 1.540 | 59.7 | 3.84 |
| 3 | | −103.049 | ASP | 0.071 | | | | |
| 4 | Lens 2 | 5.821 | ASP | 0.513 | Plastic | 1.640 | 23.3 | −5.37 |
| 5 | | 2.086 | ASP | 0.492 | | | | |
| 6 | Lens 3 | 5.986 | ASP | 0.301 | Plastic | 1.530 | 55.8 | 1357.35 |
| 7 | | 5.932 | ASP | 1.687 | | | | |
| 8 | Lens 4 | −3.393 | ASP | 0.414 | Plastic | 1.640 | 23.3 | −11.01 |
| 9 | | −6.859 | ASP | 0.320 | | | | |
| 10 | Lens 5 | 1.628 | ASP | 0.457 | Plastic | 1.535 | 55.7 | 38.81 |
| 11 | | 1.594 | ASP | 0.980 | | | | — |
| 12 | IR-cut filter | Plano | | 0.420 | Glass | 1.517 | 64.2 | |
| 13 | | Plano | | 1.188 | | | | |
| 14 | Image Surface | Plano | | — | | | | |

Note:
Reference wavelength is d-line 587.6 nm

TABLE 19

Aspheric Coefficients

| Surface # | 2 | 3 | 4 | 5 | 6 |
|---|---|---|---|---|---|
| k = | −3.4144E−02 | −4.3275E+01 | −6.0449E+01 | −6.2195E+00 | 7.8926E+00 |
| A4 = | −5.3880E−03 | −1.6981E−02 | −4.2064E−02 | −3.8937E−02 | −1.2756E−01 |
| A6 = | 8.8986E−03 | 2.7806E−02 | 3.9066E−02 | 4.2143E−02 | 1.0593E−01 |
| A8 = | −4.2494E−03 | −7.9366E−03 | 3.6437E−03 | −2.2376E−02 | −1.6945E−01 |
| A10 = | −1.9306E−03 | −1.0533E−03 | −1.2032E−02 | 2.8573E−02 | 2.3771E−01 |
| A12 = | 2.0850E−03 | 1.0057E−03 | 4.8922E−03 | −1.5207E−02 | −1.6244E−01 |
| A14 = | −4.6613E−04 | −2.2688E−04 | −6.9478E−04 | 3.8011E−03 | 5.3586E−02 |
| A16 = |  |  |  |  | −7.0337E−03 |

| Surface # | 7 | 8 | 9 | 10 | 11 |
|---|---|---|---|---|---|
| k = | 1.6310E+01 | −9.0000E+01 | 1.8497E+00 | −1.4689E+01 | −1.3814E+01 |
| A4 = | −4.8105E−02 | −3.8958E−02 | 5.1462E−03 | −1.2940E−01 | −1.0435E−01 |
| A6 = | 3.8256E−02 | 2.6473E−02 | −2.7854E−02 | 1.8326E−02 | 2.9377E−02 |
| A8 = | −1.4672E−02 | −6.9046E−03 | 2.6987E−02 | 3.8856E−03 | −6.0490E−03 |
| A10 = | 2.8493E−02 | 1.7517E−03 | −9.7577E−03 | −1.1885E−03 | 9.5392E−04 |
| A12 = | −1.6010E−02 | −6.1827E−04 | 1.7171E−03 | 1.1511E−04 | −1.0860E−04 |
| A14 = | 2.0586E−03 | 1.2833E−04 | −1.4637E−04 | −4.5274E−06 | 1.0394E−05 |
| A16 = |  | −9.5735E−06 | 4.8790E−06 | 7.1598E−08 | −5.1082E−07 |

In the 7th embodiment, the equation of the aspheric surface profiles of the aforementioned lens elements is the same as the equation of the 1st embodiment. Also, the definitions of these parameters shown in Table 20 below are the same as those stated in the 1st embodiment with corresponding values for the 7th embodiment, so an explanation in this regard will not be provided again.

Moreover, these parameters can be calculated from Table 18 and Table 19 and satisfy the conditions stated in Table 20.

TABLE 20

7$^{th}$ Embodiment

| | | | |
|---|---|---|---|
| f [mm] | 8.51 | f1/f4 | −0.35 |
| Fno | 2.70 | (\|f/f4\| + \|f/f5\|)/ | 0.26 |
| HFOV [deg.] | 19.5 | (\|f/f1\| + \|f/f2\|) | |
| (V2 + V4)/V1 | 0.78 | ImgH/(T23 + T34) | 1.47 |
| (T23 + T34)/(CT3 + CT4 + CT5) | 1.86 | f/ImgH | 2.66 |
| (CT2 + CT4)/(CT2 − CT4) | 9.36 | EPD/ImgH | 0.99 |
| CT4/CT3 | 1.38 | SD/TD | 0.88 |
| (R7 + R8)/(R7 − R8) | −2.96 | f/Yc52 | 8.91 |
| \|f/f1\| + \|f/f2\| | 3.80 | EPD/(SD11 * 2) | 0.98 |

8th Embodiment

Figure 8A:
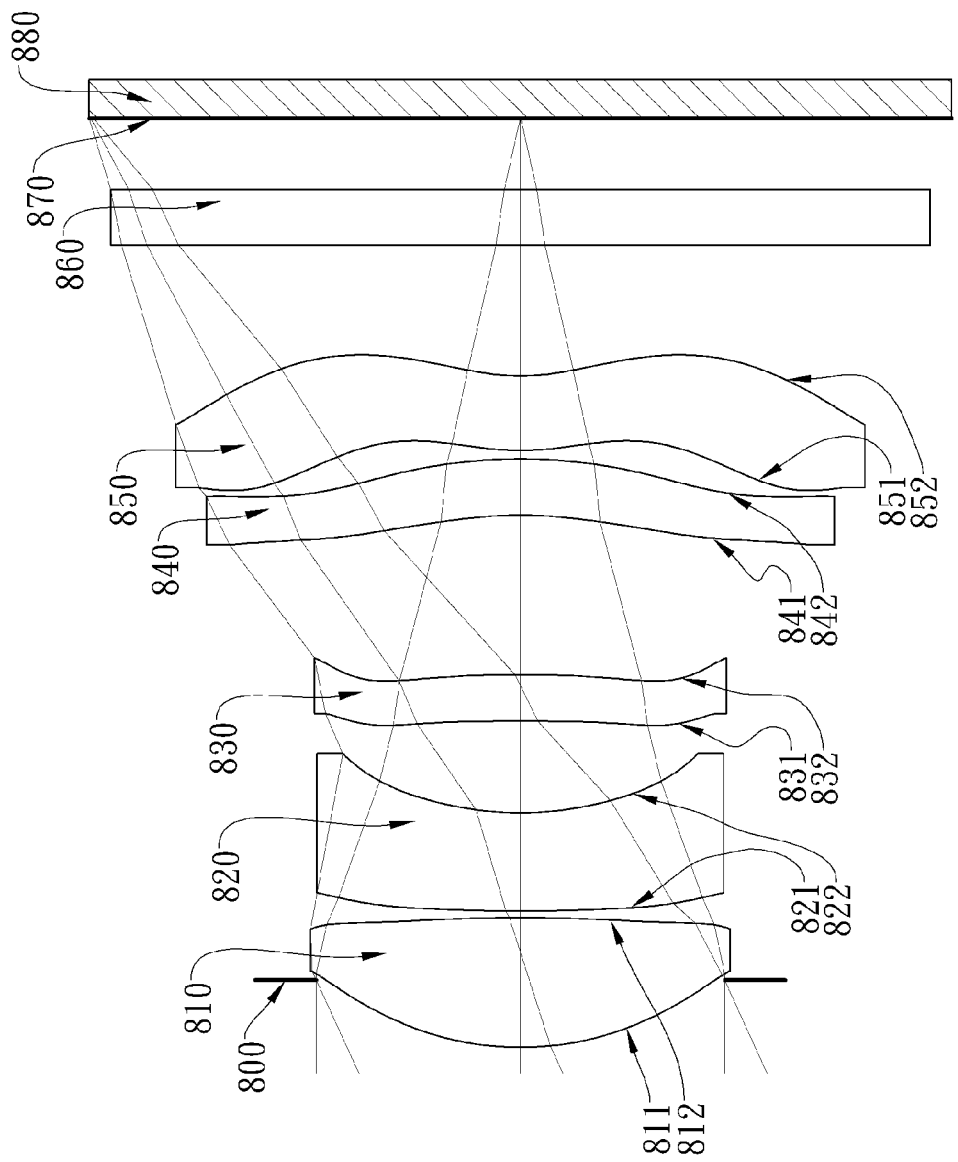
FIG. 8A is a schematic view of an image capturing device according to the eighth embodiment of the present disclosure.
Figure 8B:
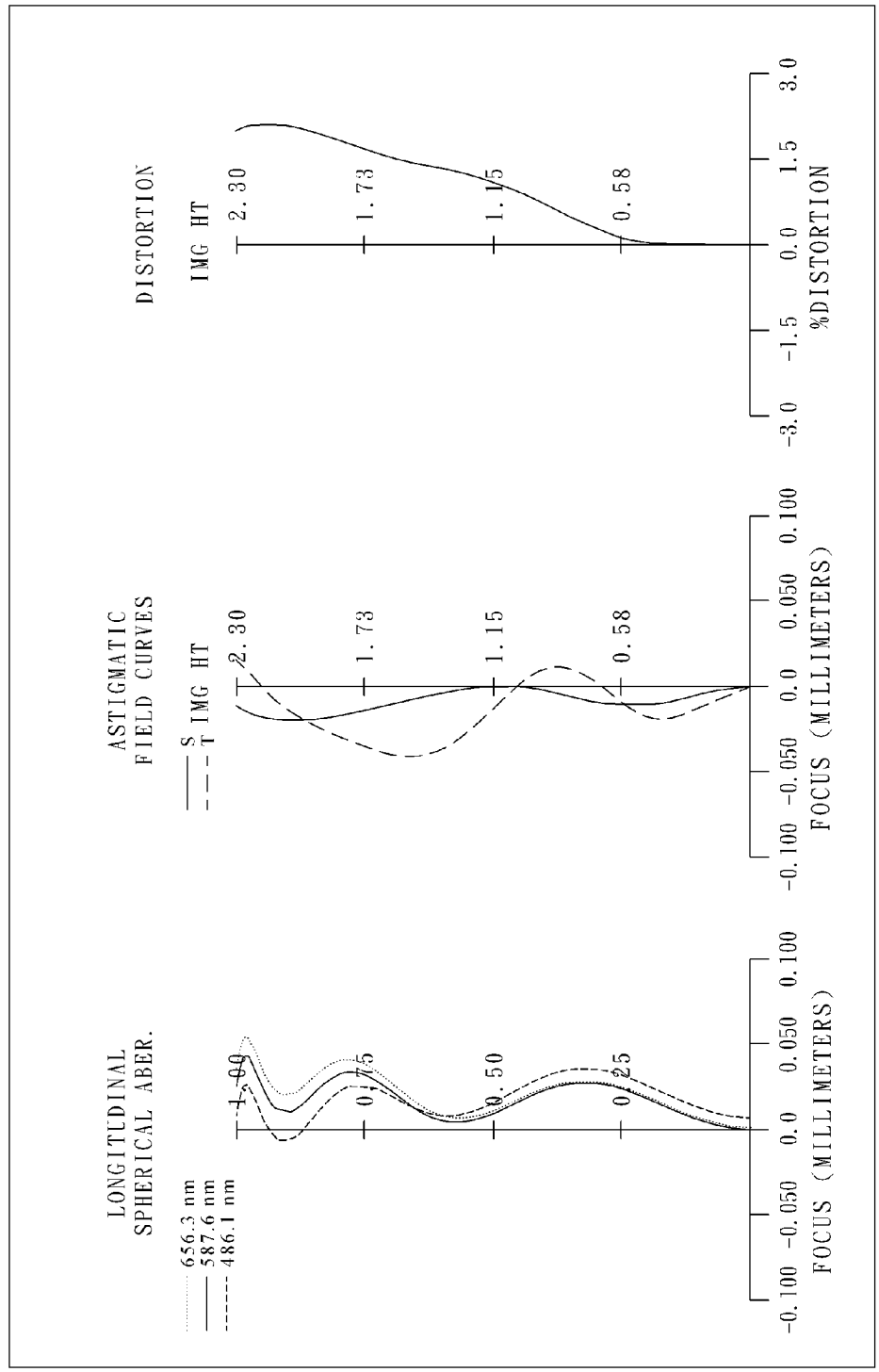
FIG. 8B shows longitudinal spherical aberration curves, astigmatic field curves and a distortion curve of the image capturing device according to the eighth embodiment.

FIG. 8A is a schematic view of an image capturing device according to the 8th embodiment of the present disclosure. FIG. 8B shows, in order from left to right, longitudinal spherical aberration curves, astigmatic field curves and a distortion curve of the image capturing device according to the 8th embodiment.

In FIG. 8A, the image capturing device includes an imaging lens system (not otherwise herein labeled) of the present disclosure and an image sensor 880. The imaging lens system includes, in order from an object side to an image side, a first lens element 810, a second lens element 820, a third lens element 830, a fourth lens element 840, and a fifth lens element 850, wherein the imaging lens system has a total of five lens elements (810-850) with refractive power.

The first lens element 810 with positive refractive power has an object-side surface 811 being convex in a paraxial region thereof and an image-side surface 812 being convex in a paraxial region thereof, which are both aspheric, and the first lens element 810 is made of plastic material.

The second lens element 820 with negative refractive power has an object-side surface 821 being convex in a paraxial region thereof and an image-side surface 822 being concave in a paraxial region thereof, which are both aspheric, and the second lens element 820 is made of plastic material.

The third lens element 830 with positive refractive power has an object-side surface 831 being concave in a paraxial region thereof and an image-side surface 832 being convex in a paraxial region thereof, which are both aspheric, and the third lens element 830 is made of plastic material. Furthermore, each of the object-side surface 831 and the image-side surface 832 of the third lens element 830 has at least one inflection point.

The fourth lens element 840 with negative refractive power has an object-side surface 841 being concave in a paraxial region thereof and an image-side surface 842 being convex in a paraxial region thereof, which are both aspheric, and the fourth lens element 840 is made of plastic material.

The fifth lens element 850 with positive refractive power has an object-side surface 851 being convex in a paraxial region thereof and an image-side surface 852 being concave in a paraxial region thereof, which are both aspheric, and the fifth lens element 850 is made of plastic material. Furthermore, each of the object-side surface 851 and the image-side surface 852 of the fifth lens element 850 has at least one inflection point.

The imaging lens system is further provided with a stop 800 disposed between an imaged object and the first lens element 810, and no lens element with refractive power is disposed between the stop 800 and the first lens element 810. The imaging lens system further includes an IR-cut filter 860 placed between the fifth lens element 850 and an image surface 870. The IR-cut filter 860 is made of glass and will not affect the focal length of the imaging lens system. The image sensor 880 is disposed on or near the image surface 870 of the imaging lens system.

The detailed optical data of the eighth embodiment are shown in TABLE 21, and the aspheric surface data are shown in TABLE 22, wherein the units of the curvature radius, the thickness and the focal length are expressed in mm, and HFOV is half of the maximal field of view.

TABLE 21

(Embodiment 8)
f = 4.92 mm, Fno = 2.25, HFOV = 24.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.360 | | | | |
| 2 | Lens 1 | 1.603 | ASP | 0.695 | Plastic | 1.544 | 55.9 | 2.60 |
| 3 | | −10.368 | ASP | 0.035 | | | | |
| 4 | Lens 2 | 7.128 | ASP | 0.527 | Plastic | 1.639 | 23.5 | −3.49 |
| 5 | | 1.648 | ASP | 0.491 | | | | |
| 6 | Lens 3 | −100.000 | ASP | 0.250 | Plastic | 1.544 | 55.9 | 16.32 |
| 7 | | −8.162 | ASP | 0.856 | | | | |
| 8 | Lens 4 | −1.809 | ASP | 0.301 | Plastic | 1.639 | 23.5 | −9.54 |
| 9 | | −2.740 | ASP | 0.045 | | | | |
| 10 | Lens 5 | 1.236 | ASP | 0.400 | Plastic | 1.544 | 55.9 | 167.93 |
| 11 | | 1.110 | ASP | 0.700 | | | | |
| 12 | IR-cut filter | Plano | | 0.300 | Glass | 1.517 | 64.2 | — |
| 13 | | Plano | | 0.380 | | | | |
| 14 | Image Surface | Plano | | — | | | | |

Note:
Reference wavelength is d-line 587.6 nm

TABLE 22

Aspheric Coefficients

| Surface # | 2 | 3 | 4 | 5 | 6 |
|---|---|---|---|---|---|
| k = | −1.0253E−01 | −7.2599E+01 | 1.1072E+01 | −4.1405E+00 | 1.0000E+00 |
| A4 = | −7.1393E−03 | −5.0447E−02 | −1.2313E−01 | −3.6384E−02 | −2.4235E−01 |
| A6 = | 2.8398E−02 | 1.4433E−01 | 2.0471E−01 | 2.1781E−01 | 5.7736E−01 |
| A8 = | −4.4376E−02 | −8.6861E−02 | 3.3569E−02 | −2.4767E−01 | −1.7628E+00 |
| A10 = | −3.4746E−02 | −2.1151E−02 | −2.5376E−01 | 5.8509E−01 | 4.8940E+00 |
| A12 = | 8.6725E−02 | 4.1788E−02 | 1.9582E−01 | −6.4001E−01 | −6.5984E+00 |
| A14 = | −4.1331E−02 | −1.9505E−02 | −5.3158E−02 | 2.4702E−01 | 4.2486E+00 |
| A16 = | | | | | −1.0814E+00 |

| Surface # | 7 | 8 | 9 | 10 | 11 |
|---|---|---|---|---|---|
| k = | −8.5266E+01 | −5.5479E+01 | −4.5864E−01 | −1.8517E+01 | −8.7647E+00 |
| A4 = | −1.4402E−01 | −1.0539E−01 | 3.4370E−02 | −3.3564E−01 | −2.1543E−01 |
| A6 = | 2.1785E−01 | 1.4362E−01 | −1.5383E−01 | 9.5699E−02 | 1.1507E−01 |
| A8 = | −1.4243E−01 | −7.2195E−02 | 2.8531E−01 | 3.9945E−02 | −5.4818E−02 |
| A10 = | 6.0477E−01 | 3.5487E−02 | −2.0132E−01 | −2.4753E−02 | 2.1410E−02 |
| A12 = | −6.2859E−01 | −2.5351E−02 | 6.9493E−02 | 4.6732E−03 | −5.6664E−03 |
| A14 = | 1.7921E−01 | 1.0178E−02 | −1.1651E−02 | −3.7053E−04 | 8.3340E−04 |
| A16 = | | −1.4649E−03 | 7.3788E−04 | 1.1138E−05 | −4.7748E−05 |

In the 8th embodiment, the equation of the aspheric surface profiles of the aforementioned lens elements is the same as the equation of the 1st embodiment. Also, the definitions of these parameters shown in Table 23 below are the same as those stated in the 1st embodiment with corresponding values for the 8th embodiment, so an explanation in this regard will not be provided again.

Moreover, these parameters can be calculated from Table 21 and Table 22 and satisfy the conditions stated in Table 23.

TABLE 23

| 8th Embodiment | | | |
|---|---|---|---|
| f [mm] | 4.92 | f1/f4 | −0.27 |
| Fno | 2.25 | (|f/f4| + |f/f5|)/ | 0.17 |
| HFOV [deg.] | 24.5 | (|f/f1| + |f/f2|) | |
| (V2 + V4)/V1 | 0.84 | ImgH/(T23 + T34) | 1.71 |
| (T23 + T34)/(CT3 + CT4 + CT5) | 1.42 | f/ImgH | 2.14 |
| (CT2 + CT4)/(CT2 − CT4) | 3.66 | EPD/ImgH | 0.95 |
| CT4/CT3 | 1.20 | SD/TD | 0.90 |

TABLE 23-continued

| 8th Embodiment | | | |
|---|---|---|---|
| (R7 + R8)/(R7 − R8) | −4.89 | f/Yc52 | 5.75 |
| |f/f1| + |f/f2| | 3.30 | EPD/(SD11 * 2) | 0.98 |

9th Embodiment

Figure 9A:
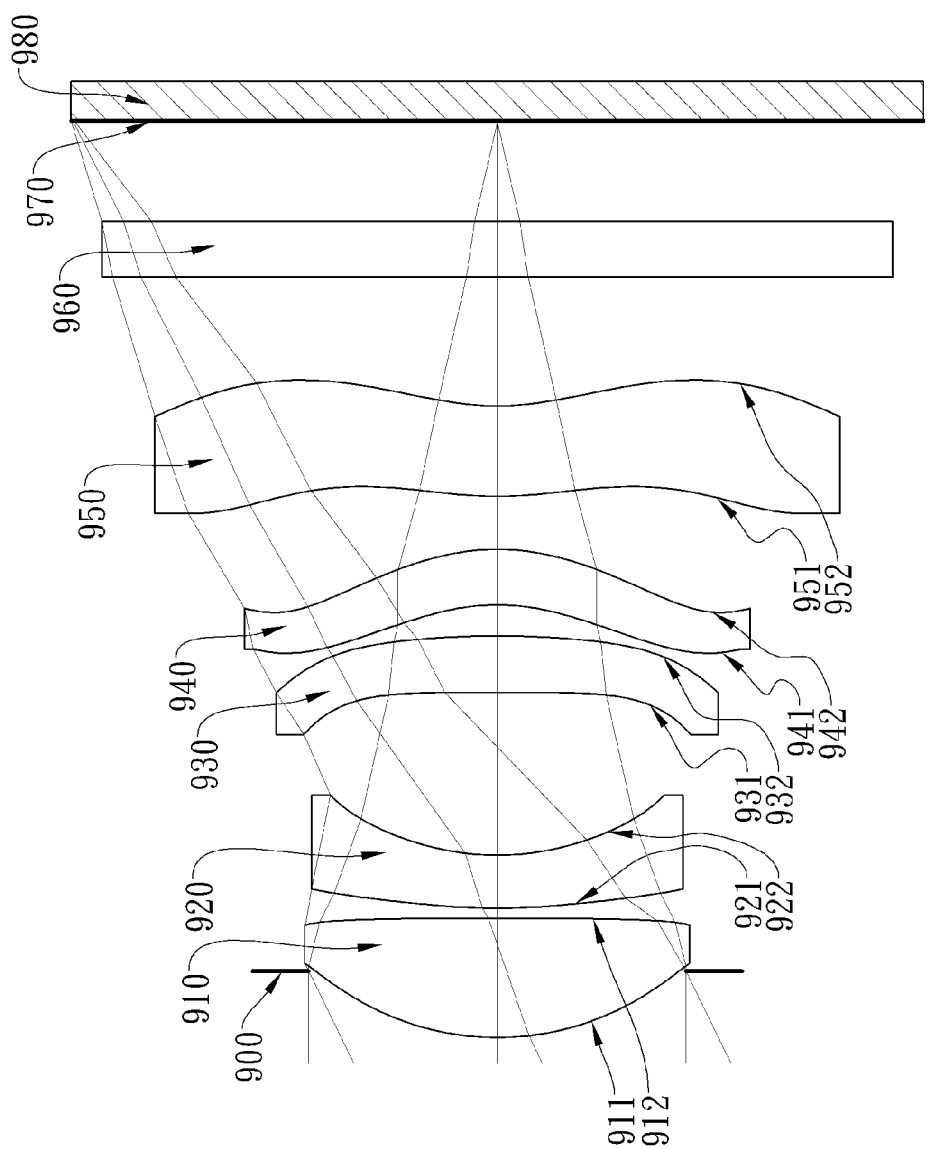
FIG. 9A is a schematic view of an image capturing device according to the ninth embodiment of the present disclosure.
Figure 9B:
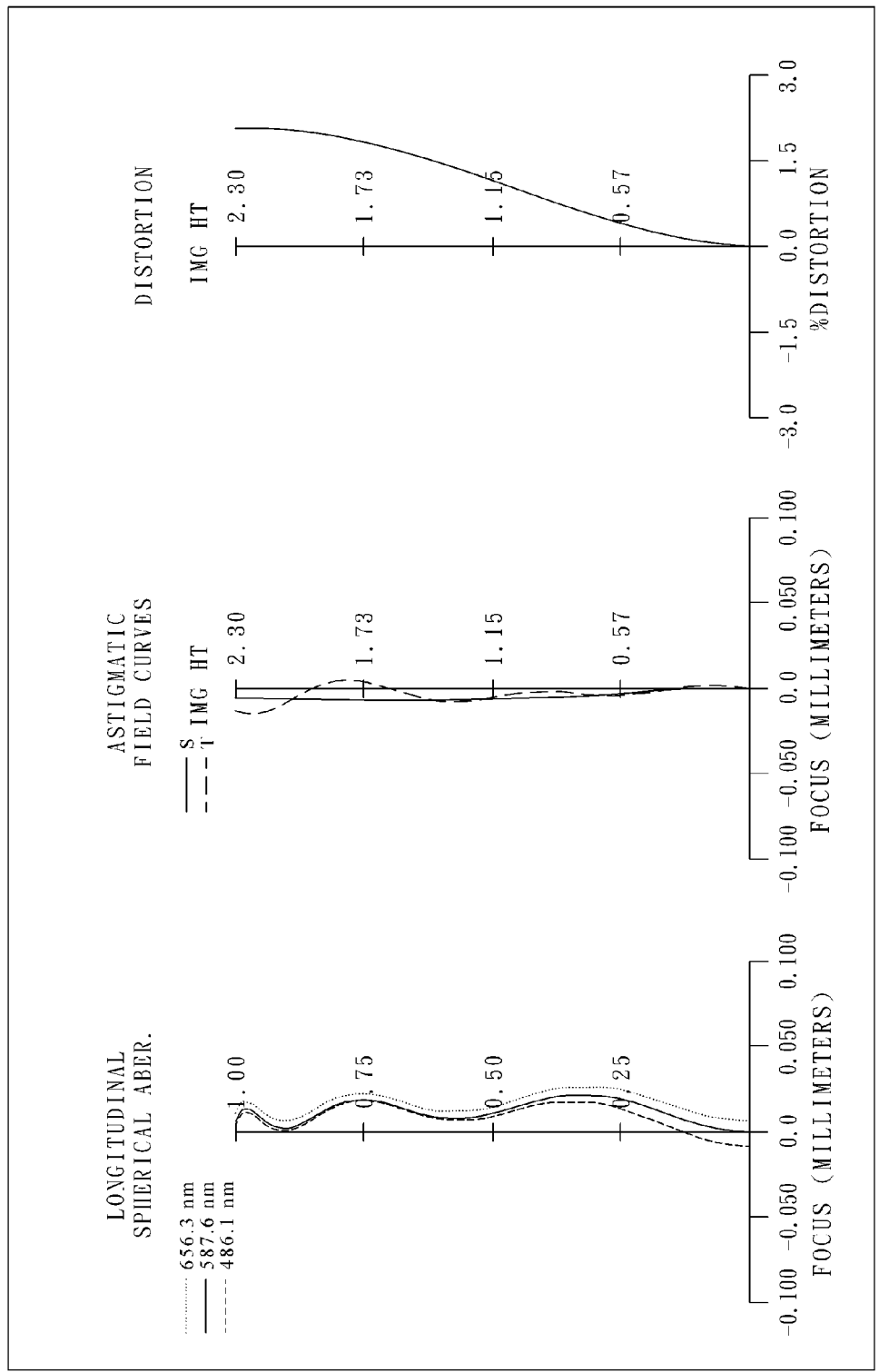
FIG. 9B shows longitudinal spherical aberration curves, astigmatic field curves and a distortion curve of the image capturing device according to the ninth embodiment.

FIG. 9A is a schematic view of an image capturing device according to the 9th embodiment of the present disclosure. FIG. 9B shows, in order from left to right, longitudinal spherical aberration curves, astigmatic field curves and a distortion curve of the image capturing device according to the 9th embodiment.

In FIG. 9A, the image capturing device includes an imaging lens system (not otherwise herein labeled) of the present disclosure and an image sensor 980. The imaging lens system includes, in order from an object side to an image side, a first lens element 910, a second lens element 920, a third lens element 930, a fourth lens element 940, and a fifth lens element 950, wherein the imaging lens system has a total of five lens elements (910-950) with refractive power.

The first lens element 910 with positive refractive power has an object-side surface 911 being convex in a paraxial region thereof and an image-side surface 912 being concave in a paraxial region thereof, which are both aspheric, and the first lens element 910 is made of plastic material.

The second lens element 920 with negative refractive power has an object-side surface 921 being convex in a paraxial region thereof and an image-side surface 922 being concave in a paraxial region thereof, which are both aspheric, and the second lens element 920 is made of plastic material.

The third lens element 930 with positive refractive power has an object-side surface 931 being convex in a paraxial region thereof and an image-side surface 932 being convex in a paraxial region thereof, which are both aspheric, and the third lens element 930 is made of plastic material. Furthermore, the object-side surface 931 of the third lens element 930 has at least one inflection point.

The fourth lens element 940 with negative refractive power has an object-side surface 941 being concave in a paraxial region thereof and an image-side surface 942 being convex in a paraxial region thereof, which are both aspheric, and the fourth lens element 940 is made of plastic material.

The fifth lens element 950 with negative refractive power has an object-side surface 951 being convex in a paraxial region thereof and an image-side surface 952 being concave in a paraxial region thereof, which are both aspheric, and the fifth lens element 950 is made of plastic material. Furthermore, each of the object-side surface 951 and the image-side surface 952 of the fifth lens element 950 has at least one inflection point.

The imaging lens system is further provided with a stop 900 disposed between an imaged object and the first lens element 910, and no lens element with refractive power is disposed between the stop 900 and the first lens element 910. The imaging lens system further includes an IR-cut filter 960 placed between the fifth lens element 950 and an image surface 970. The IR-cut filter 960 is made of glass and will not affect the focal length of the imaging lens system. The image sensor 980 is disposed on or near the image surface 970 of the imaging lens system.

The detailed optical data of the ninth embodiment are shown in TABLE 24, and the aspheric surface data are shown in TABLE 25, wherein the units of the curvature radius, the thickness and the focal length are expressed in mm, and HFOV is half of the maximal field of view.

TABLE 24

(Embodiment 9)
f = 4.60 mm, Fno = 2.25, HFOV = 26.1 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Stop | Plano |  | −0.360 |  |  |  |  |
| 2 | Lens 1 | 1.494 | ASP | 0.646 | Plastic | 1.544 | 55.9 | 2.79 |
| 3 |  | 82.713 | ASP | 0.055 |  |  |  |  |
| 4 | Lens 2 | 2.938 | ASP | 0.288 | Plastic | 1.639 | 23.5 | −4.26 |
| 5 |  | 1.359 | ASP | 0.882 |  |  |  |  |
| 6 | Lens 3 | 100.000 | ASP | 0.307 | Plastic | 1.544 | 55.9 | 8.79 |
| 7 |  | −5.016 | ASP | 0.170 |  |  |  |  |
| 8 | Lens 4 | −1.114 | ASP | 0.300 | Plastic | 1.639 | 23.5 | −70.51 |
| 9 |  | −1.262 | ASP | 0.288 |  |  |  |  |
| 10 | Lens 5 | 1.963 | ASP | 0.490 | Plastic | 1.544 | 55.9 | −12.44 |
| 11 |  | 1.388 | ASP | 0.700 |  |  |  |  |
| 12 | IR-cut filter | Plano |  | 0.300 | Glass | 1.517 | 64.2 | — |
| 13 |  | Plano |  | 0.548 |  |  |  |  |
| 14 | Image Surface | Plano |  | — |  |  |  |  |

Note:
Reference wavelength is d-line 587.6 nm

TABLE 25

Aspheric Coefficients

| Surface # | 2 | 3 | 4 | 5 | 6 |
|---|---|---|---|---|---|
| k = | −9.3626E−02 | 2.0000E+01 | −2.1714E+01 | −3.6218E+00 | 1.0000E+00 |
| A4 = | 7.8555E−04 | −8.3642E−02 | −1.1013E−01 | 2.8869E−02 | −8.1038E−02 |
| A6 = | 2.0832E−02 | 1.3573E−01 | 1.3978E−01 | 6.4898E−02 | −7.9840E−02 |
| A8 = | −3.4772E−02 | −8.6292E−02 | 2.5141E−02 | 1.4436E−01 | −2.3333E−01 |
| A10 = | −2.6585E−02 | −1.9624E−02 | −1.6020E−01 | −2.2024E−01 | 6.9395E−01 |
| A12 = | 8.4710E−02 | 4.1441E−02 | 1.0144E−01 | 1.1647E−01 | −8.7228E−01 |
| A14 = | −5.1340E−02 | −2.0803E−02 | −1.1777E−02 | 3.5447E−02 | 5.0337E−01 |
| A16 = |  |  |  |  | −1.1288E−01 |

| Surface # | 7 | 8 | 9 | 10 | 11 |
|---|---|---|---|---|---|
| k = | 1.0098E+01 | −7.3671E+00 | −7.2330E−01 | −2.1120E+01 | −8.2277E+00 |
| A4 = | 3.6441E−02 | −2.3904E−01 | 4.4522E−02 | −1.7965E−01 | −1.3070E−01 |
| A6 = | −1.1569E−01 | 7.7734E−01 | 2.1960E−01 | 1.0024E−01 | 6.6308E−02 |
| A8 = | 4.6691E−02 | −1.2095E+00 | −3.4449E−01 | −5.4730E−02 | −3.1237E−02 |

TABLE 25-continued

| Aspheric Coefficients | | | | |
|---|---|---|---|---|
| A10 = | −1.6742E−02 | 1.1413E+00 | 2.8848E−01 | 2.6630E−02 | 1.0794E−02 |
| A12 = | 1.2441E−03 | −6.1794E−01 | −1.1085E−01 | −7.3097E−03 | −2.4103E−03 |
| A14 = | 2.4424E−03 | 1.7823E−01 | 1.6437E−02 | 9.7659E−04 | 3.0722E−04 |
| A16 = | | −2.1565E−02 | −3.8674E−04 | −4.9765E−05 | −1.6070E−05 |

In the 9th embodiment, the equation of the aspheric surface profiles of the aforementioned lens elements is the same as the equation of the 1st embodiment. Also, the definitions of these parameters shown in Table 26 below are the same as those stated in the 1st embodiment with corresponding values for the 9th embodiment, so an explanation in this regard will not be provided again.

Moreover, these parameters can be calculated from Table 24 and Table 25 and satisfy the conditions stated in Table 26.

TABLE 26

| $9^{th}$ Embodiment | | | |
|---|---|---|---|
| f [mm] | 4.60 | f1/f4 | −0.04 |
| Fno | 2.25 | (|f/f4| + |f/f5|)/ | 0.16 |
| HFOV [deg.] | 26.1 | (|f/f1| + |f/f2|) | |
| (V2 + V4)/V1 | 0.84 | ImgH/(T23 + T34) | 2.19 |
| (T23 + T34)/(CT3 + CT4 + CT5) | 0.96 | f/ImgH | 2.00 |
| (CT2 + CT4)/(CT2 − CT4) | −49.00 | EPD/ImgH | 0.89 |
| CT4/CT3 | 0.98 | SD/TD | 0.89 |
| (R7 + R8)/(R7 − R8) | −16.04 | f/Yc52 | 4.32 |
| |f/f1| + |f/f2| | 2.73 | EPD/(SD11 * 2) | 0.98 |

10th Embodiment

Figure 10A:
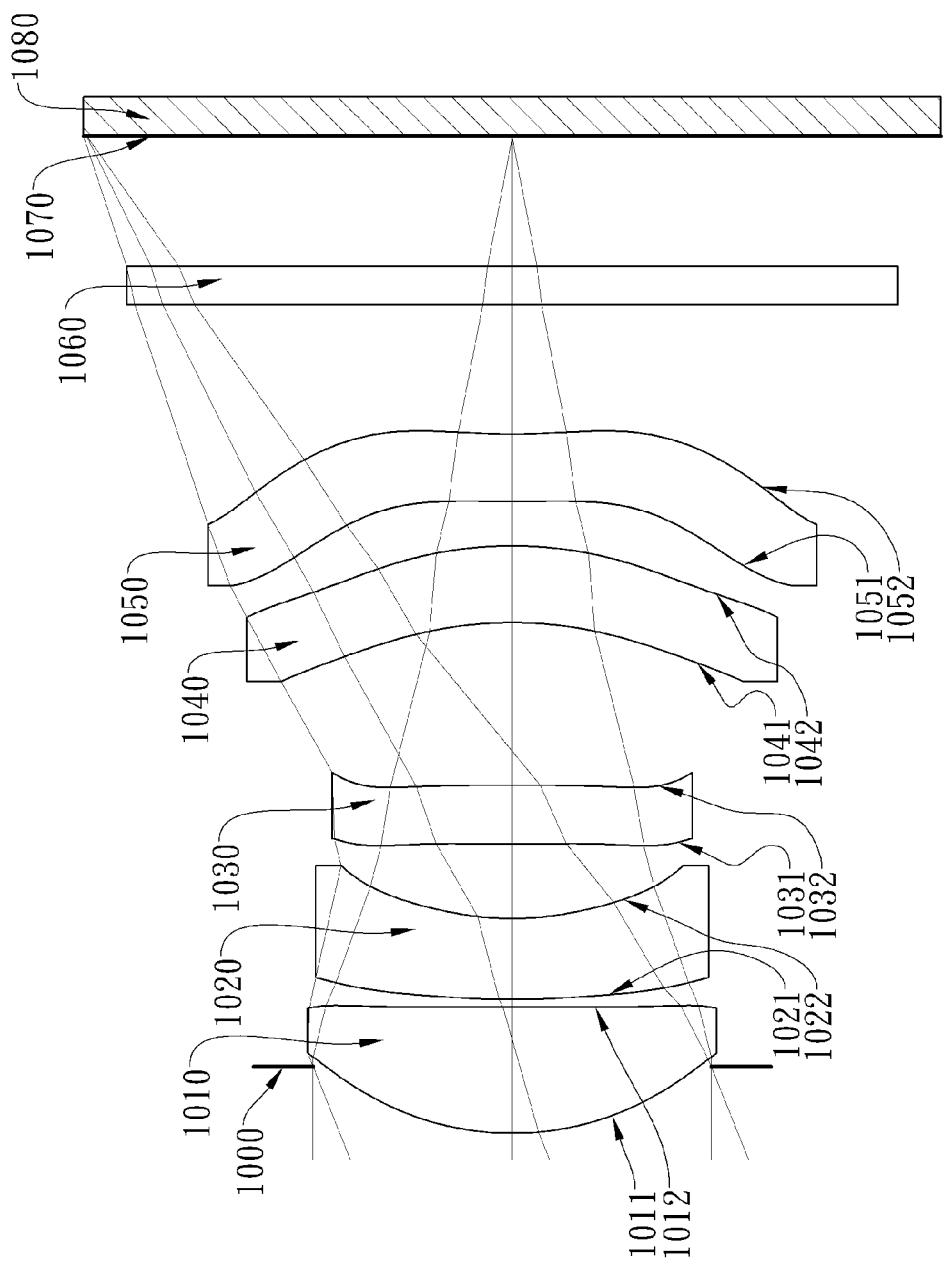
FIG. 10A is a schematic view of an image capturing device according to the tenth embodiment of the present disclosure.
Figure 10B:
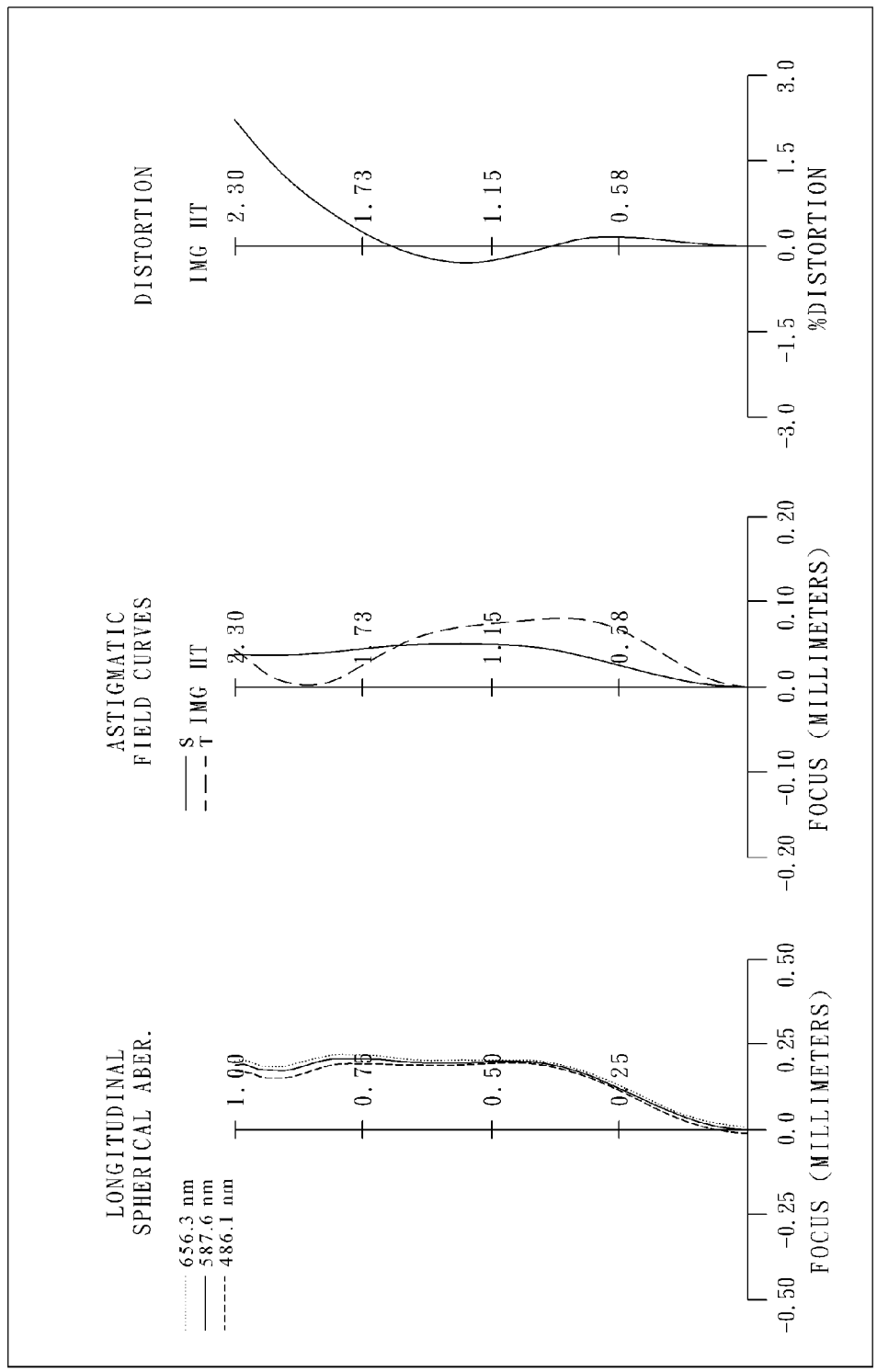
FIG. 10B shows longitudinal spherical aberration curves, astigmatic field curves and a distortion curve of the image capturing device according to the tenth embodiment.

FIG. 10A is a schematic view of an image capturing device according to the 10th embodiment of the present disclosure. FIG. 10B shows, in order from left to right, longitudinal spherical aberration curves, astigmatic field curves and a distortion curve of the image capturing device according to the 10th embodiment.

In FIG. 10A, the image capturing device includes an imaging lens system (not otherwise herein labeled) of the present disclosure and an image sensor 1080. The imaging lens system includes, in order from an object side to an image side, a first lens element 1010, a second lens element 1020, a third lens element 1030, a fourth lens element 1040, and a fifth lens element 1050, wherein the imaging lens system has a total of five lens elements (1010-1050) with refractive power.

The first lens element 1010 with positive refractive power has an object-side surface 1011 being convex in a paraxial region thereof and an image-side surface 1012 being concave in a paraxial region thereof, which are both aspheric, and the first lens element 1010 is made of plastic material.

The second lens element 1020 with negative refractive power has an object-side surface 1021 being convex in a paraxial region thereof and an image-side surface 1022 being concave in a paraxial region thereof, which are both aspheric, and the second lens element 1020 is made of plastic material.

The third lens element 1030 with positive refractive power has an object-side surface 1031 being convex in a paraxial region thereof and an image-side surface 1032 being convex in a paraxial region thereof, which are both aspheric, and the third lens element 1030 is made of plastic material. Furthermore, each of the object-side surface 1031 and the image-side surface 1032 of the third lens element 1030 has at least one inflection point.

The fourth lens element 1040 with positive refractive power has an object-side surface 1041 being concave in a paraxial region thereof and an image-side surface 1042 being convex in a paraxial region thereof, which are both aspheric, and the fourth lens element 1040 is made of plastic material.

The fifth lens element 1050 with negative refractive power has an object-side surface 1051 being convex in a paraxial region thereof and an image-side surface 1052 being concave in a paraxial region thereof, which are both aspheric, and the fifth lens element 1050 is made of plastic material. Furthermore, each of the object-side surface 1051 and the image-side surface 1052 of the fifth lens element 1050 has at least one inflection point.

The imaging lens system is further provided with a stop 1000 disposed between an imaged object and the first lens element 1010, and no lens element with refractive power is disposed between the stop 1000 and the first lens element 1010. The imaging lens system further includes an IR-cut filter 1060 placed between the fifth lens element 1050 and an image surface 1070. The IR-cut filter 1060 is made of glass and will not affect the focal length of the imaging lens system. The image sensor 1080 is disposed on or near the image surface 1070 of the imaging lens system.

The detailed optical data of the tenth embodiment are shown in TABLE 27, and the aspheric surface data are shown in TABLE 28, wherein the units of the curvature radius, the thickness and the focal length are expressed in mm, and HFOV is half of the maximal field of view.

TABLE 27

| (Embodiment 10) f = 5.38 mm, Fno = 2.50, HFOV = 21.8 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Stop | Plano | | −0.360 | | | | |
| 2 | Lens 1 | 1.559 | ASP | 0.683 | Plastic | 1.544 | 55.9 | 2.94 |
| 3 | | 51.241 | ASP | 0.040 | | | | |
| 4 | Lens 2 | 3.732 | ASP | 0.438 | Plastic | 1.634 | 23.8 | −4.25 |
| 5 | | 1.493 | ASP | 0.402 | | | | |
| 6 | Lens 3 | 9.507 | ASP | 0.319 | Plastic | 1.544 | 55.9 | 15.68 |
| 7 | | −82.417 | ASP | 0.880 | | | | |
| 8 | Lens 4 | −2.158 | ASP | 0.415 | Plastic | 1.544 | 55.9 | 48.21 |

TABLE 27-continued (Embodiment 10)
f = 5.38 mm, Fno = 2.50, HFOV = 21.8 deg.

| Surface # | | Curvature Radius | | Thickness | Material | Index | Abbe # | Focal Length |
|---|---|---|---|---|---|---|---|---|
| 9 | | −2.129 | ASP | 0.240 | | | | |
| 10 | Lens 5 | 10.480 | ASP | 0.364 | Plastic | 1.634 | 23.8 | −7.84 |
| 11 | | 3.325 | ASP | 0.700 | | | | |
| 12 | IR-cut filter | Plano | | 0.210 | Glass | 1.517 | 64.2 | — |
| 13 | | Plano | | 0.703 | | | | |
| 14 | Image Surface | Plano | | — | | | | |

Note:
Reference wavelength is d-line 587.6 nm

TABLE 28

Aspheric Coefficients

| Surface # | 2 | 3 | 4 | 5 | 6 |
|---|---|---|---|---|---|
| k = | −7.3860E−02 | −9.0000E+01 | −4.6096E+01 | −5.9010E+00 | −9.0000E+01 |
| A4 = | −3.1740E−03 | −6.0369E−02 | −1.1147E−01 | −6.3352E−02 | −2.9902E−01 |
| A6 = | 3.5648E−02 | 1.4360E−01 | 2.0409E−01 | 2.2776E−01 | 5.9401E−01 |
| A8 = | −4.5503E−02 | −8.6641E−02 | 3.2756E−02 | −2.3686E−01 | −1.7728E+00 |
| A10 = | −3.6188E−02 | −2.1269E−02 | −2.5326E−01 | 5.8897E−01 | 4.9037E+00 |
| A12 = | 8.6312E−02 | 4.1585E−02 | 1.9645E−01 | −6.3571E−01 | −6.5923E+00 |
| A14 = | −4.0934E−02 | −1.9558E−02 | −5.2856E−02 | 2.5615E−01 | 4.2448E+00 |
| A16 = | | | | | −1.0781E+00 |

| Surface # | 7 | 8 | 9 | 10 | 11 |
|---|---|---|---|---|---|
| k = | 2.0000E+01 | −1.1650E+01 | 3.5889E−01 | −3.7416E+01 | −2.8637E+01 |
| A4 = | −1.4325E−01 | −1.4294E−01 | 4.1185E−02 | −3.4929E−01 | −2.9034E−01 |
| A6 = | 2.0750E−01 | 1.3965E−01 | −1.5228E−01 | 9.6210E−02 | 1.5588E−01 |
| A8 = | −1.3892E−01 | −7.0446E−02 | 2.8529E−01 | 4.0474E−02 | −6.4132E−02 |
| A10 = | 6.0949E−01 | 3.6697E−02 | −2.0162E−01 | −2.4638E−02 | 1.9477E−02 |
| A12 = | −6.2432E−01 | −2.4991E−02 | 6.9491E−01 | 4.6654E−03 | −4.3998E−03 |
| A14 = | 1.8408E−01 | 1.0121E−02 | −1.1659E−02 | −3.4958E−04 | 8.4542E−04 |
| A16 = | | −1.7097E−03 | 7.1893E−04 | 1.1138E−05 | −7.7827E−05 |

In the 10th embodiment, the equation of the aspheric surface profiles of the aforementioned lens elements is the same as the equation of the 1st embodiment. Also, the definitions of these parameters shown in Table 29 below are the same as those stated in the 1st embodiment with corresponding values for the 10th embodiment, so an explanation in this regard will not be provided again.

Moreover, these parameters can be calculated from Table 27 and Table 28 and satisfy the conditions stated in Table 29.

TABLE 29

10$^{th}$ Embodiment

| f [mm] | 5.38 | f1/f4 | 0.06 |
|---|---|---|---|
| Fno | 2.50 | (|f/f4| + |f/f5|)/ | 0.26 |
| HFOV [deg.] | 21.8 | (|f/f1| + |f/f2|) | |
| (V2 + V4)/V1 | 1.43 | ImgH/(T23 + T34) | 1.79 |
| (T23 + T34)/(CT3 + CT4 + CT5) | 1.17 | f/ImgH | 2.34 |
| (CT2 + CT4)/(CT2 − CT4) | 37.09 | EPD/ImgH | 0.94 |
| CT4/CT3 | 1.30 | SD/TD | 0.90 |
| (R7 + R8)/(R7 − R8) | 148.39 | f/Yc52 | 10.86 |
| |f/f1| + |f/f2| | 3.10 | EPD/(SD11 * 2) | 0.97 |

The foregoing description, for purpose of explanation, has been described with reference to specific embodiments. It is to be noted that TABLES 1-29 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, including, in order from an object side to an image side:
    a first lens element with positive refractive power having a convex object-side surface;
    a second lens element with negative refractive power;
    a third lens element with refractive power;
    a fourth lens element with refractive power having an object-side surface and an image-side surface thereof being aspheric; and
    a fifth lens element with refractive power having a convex object-side surface, the object-side surface and an image-side surface thereof both being aspheric, and at least one of the object-side surface and the image-side surface being provided with at least one inflection point;
    wherein the imaging lens system is further provided with a stop, and no lens element with refractive power is disposed between the stop and the first lens element;
    wherein the imaging lens system has a total of five lens elements with refractive power;

wherein an axial distance between the second lens element and the third lens element is T23, an axial distance between the third lens element and the fourth lens element is T34, a central thickness of the second lens element is CT2, a central thickness of the third lens element is CT3, a central thickness of the fourth lens element is CT4, a central thickness of the fifth lens element is CT5, a focal length of the imaging lens system is f, a focal length of the first lens element is f1, a focal length of the second lens element is f2, a focal length of the fourth lens element is f4, a focal length of the fifth lens element is f5, an axial distance between the stop and the image-side surface of the fifth lens element is SD, an axial distance between the object-side surface of the first lens element and the image-side surface of the fifth lens element is TD, and the following conditions are satisfied:

$0.90 < (T23+T34)/(CT3+CT4+CT5);$ $(|f/f4|+|f/f5|)/(|f/f1|+|f/f2|) < 0.60;$ $0.7 < SD/TD < 1.1;$ and $1.0 < (CT2+CT4)/(CT2-CT4).$ 2. The imaging lens system of claim 1, wherein the focal length of the first lens element is f1, the focal length of the fourth lens element is f4, and the following condition is satisfied:

$-1.0 < f1/f4 < 0.$

3. The imaging lens system of claim 2, wherein the second lens element has a concave image-side surface, and the object-side surface of the fourth lens element is concave.

4. The imaging lens system of claim 1, wherein an Abbe number of the first lens element is V1, an Abbe number of the second lens element is V2, an Abbe number of the fourth lens element is V4, and the following condition is satisfied:

$0.5 < (V2+V4)/V1 < 1.0.$

5. The imaging lens system of claim 1, wherein the image-side surface of the fourth lens element is convex, and the image-side surface of the fifth lens element is concave.

6. The imaging lens system of claim 5, wherein the fifth lens element has negative refractive power.

7. The imaging lens system of claim 1, wherein the focal length of the imaging lens system is f, a maximum image height of the imaging lens system is ImgH, and the following condition is satisfied:

$1.9 < f/ImgH < 5.0.$

8. The imaging lens system of claim 7, wherein a curvature radius of the object-side surface of the fourth lens element is R7, a curvature radius of the image-side surface of the fourth lens element is R8, and the following condition is satisfied:

$-35 < (R7+R8)/(R7-R8) < -1.0.$

9. The imaging lens system of claim 7, wherein the maximum image height of the imaging lens system is ImgH, the axial distance between the second lens element and the third lens element is T23, the axial distance between the third lens element and the fourth lens element is T34, and the following condition is satisfied:

$1.0 < ImgH/(T23+T34) < 2.2.$

10. The imaging lens system of claim 1, wherein the second lens element has a convex object-side surface and a concave image-side surface.

11. The imaging lens system of claim 1, wherein the axial distance between the second lens element and the third lens element is T23, the axial distance between the third lens element and the fourth lens element is T34, the central thickness of the third lens element is CT3, the central thickness of the fourth lens element is CT4, the central thickness of the fifth lens element is CT5, and the following condition is satisfied:

$1.0 < (T23+T34)/(CT3+CT4+CT5).$

12. The imaging lens system of claim 1, wherein the central thickness of the second lens element is CT2, the central thickness of the fourth lens element is CT4, and the following condition is satisfied:

$2.0 < (CT2+CT4)/(CT2-CT4) < 50.$

13. The imaging lens system of claim 1, wherein the focal length of the imaging lens system is f, the focal length of the first lens element is f1, the focal length of the second lens element is f2, and the following condition is satisfied:

$2.5 < |f/f1|+|f/f2|.$

14. The imaging lens system of claim 1, wherein the focal length of the imaging lens system is f, a vertical distance between a critical point on the image-side surface of the fifth lens element and an optical axis is Yc52, and the following condition is satisfied:

$3.0 < f/Yc52 < 20.$

15. An image capturing device, including the imaging lens system of claim 1 and an image sensor.

16. An electronic device, including the image capturing device of claim 15.

17. An imaging lens system, including, in order from an object side to an image side:
    a first lens element with positive refractive power having a convex object-side surface;
    a second lens element with negative refractive power having a convex object-side surface and a concave image-side surface;
    a third lens element with refractive power;
    a fourth lens element with negative refractive power having an object-side surface and an image-side surface thereof being aspheric; and
    a fifth lens element with refractive power having a concave image-side surface, an object-side surface and the image-side surface thereof being aspheric and at least one of the object-side surface and the image-side surface being provided with at least one inflection point;
    wherein the imaging lens system is further provided with a stop, and no lens element with refractive power is disposed between the stop and the first lens element;
    wherein the imaging lens system has a total of five lens elements with refractive power;
    wherein an axial distance between the second lens element and the third lens element is T23, an axial distance between the third lens element and the fourth lens element is T34, a central thickness of the third lens element is CT3, a central thickness of the fourth lens element is CT4, a central thickness of the fifth lens element is CT5, a focal length of the imaging lens system is f, a focal length of the first lens element is f1, a focal length of the second lens element is f2, a focal length of the fourth lens element is f4, a focal length of the fifth lens element is f5, an axial distance between the stop and the image-side surface of the fifth lens element is SD, an axial distance between the object-side surface of the first lens element and the image-side surface of the fifth lens element is TD, and the following conditions are satisfied:

$0.90 < (T23+T34)/(CT3+CT4+CT5);$ $(|f/f4|+|f/f5|)/(|f/f1|+|f/f2|) < 1.0;$ $0.7 < SD/TD < 1.1;$ and $0.3 < CT4/CT3 < 2.5.$ 18. The imaging lens system of claim 17, wherein half of a maximal field of view of the imaging lens system is HFOV, and the following condition is satisfied:

10.0 [deg.] < HFOV < 30.0 [deg.].

19. The imaging lens system of claim 18, wherein the object-side surface of the fourth lens element is concave, and the image-side surface of the fourth lens element is convex.

20. The imaging lens system of claim 18, wherein the third lens element has positive refractive power.

21. The imaging lens system of claim 17, wherein the focal length of the first lens element is f1, the focal length of the fourth lens element is f4, and the following condition is satisfied:

$-0.5 < f1/f4 < 0.$

22. The imaging lens system of claim 17, wherein the axial distance between the second lens element and the third lens element is T23, the axial distance between the third lens element and the fourth lens element is T34, the central thickness of the third lens element is CT3, the central thickness of the fourth lens element is CT4, the central thickness of the fifth lens element is CT5, and the following condition is satisfied:

$1.0 < (T23+T34)/(CT3+CT4+CT5).$

23. The imaging lens system of claim 17, wherein a maximum effective radius of the object-side surface of the first lens element is SD11, an entrance pupil diameter of the imaging lens system is EPD, and the following condition is satisfied:

$0.95 < EPD/(SD11*2) < 1.1.$

24. An imaging lens system, including, in order from an object side to an image side:
a first lens element with positive refractive power having a convex object-side surface;
a second lens element with negative refractive power;
a third lens element with refractive power;
a fourth lens element with negative refractive power having a concave object-side surface, the object-side surface and an image-side surface thereof being aspheric; and
a fifth lens element with refractive power having a concave image-side surface, an object-side surface and the image-side surface thereof being aspheric and at least one of the object-side surface and the image-side surface being provided with at least one inflection point;
wherein the imaging lens system is further provided with a stop, and no lens element with refractive power is disposed between the stop and the first lens element;
wherein the imaging lens system has a total of five lens elements with refractive power;
wherein an axial distance between the second lens element and the third lens element is T23, an axial distance between the third lens element and the fourth lens element is T34, a central thickness of the third lens element is CT3, a central thickness of the fourth lens element is CT4, a central thickness of the fifth lens element is CT5, a focal length of the imaging lens system is f, a focal length of the first lens element is f1, a focal length of the second lens element is f2, a focal length of the fourth lens element is f4, a focal length of the fifth lens element is f5, an axial distance between the stop and the image-side surface of the fifth lens element is SD, an axial distance between the object-side surface of the first lens element and the image-side surface of the fifth lens element is TD, and the following conditions are satisfied:

$0.90 < (T23+T34)/(CT3+CT4+CT5);$ $(|f/f4|+|f/f5|)/(|f/f1|+|f/f2|) < 1.0;$ $0.7 < SD/TD < 1.1;$ and $0.3 < CT4/CT3 < 2.5.$ 25. The imaging lens system of claim 24, wherein the second lens element has a concave image-side surface, at least one of object-side surfaces and image-side surfaces of the first lens element, the second lens element, the third lens element, the fourth lens element and the fifth lens element is aspheric, and the first lens element, the second lens element, the third lens element, the fourth lens element and the fifth lens element are all made of plastic material.

26. The imaging lens system of claim 25, wherein at least one of the object-side surface and the image-side surface of the third lens element is provided with at least one inflection point.

27. The imaging lens system of claim 25, wherein a curvature radius of the object-side surface and a curvature radius of the image-side surface of the third lens element are both either positive or negative.

28. The imaging lens system of claim 24, wherein the axial distance between the second lens element and the third lens element is T23, the axial distance between the third lens element and the fourth lens element is T34, the central thickness of the third lens element is CT3, the central thickness of the fourth lens element is CT4, the central thickness of the fifth lens element is CT5, and the following condition is satisfied:

$1.15 < (T23+T34)/(CT3+CT4+CT5).$

29. The imaging lens system of claim 24, wherein an Abbe number of the first lens element is V1, an Abbe number of the second lens element is V2, an Abbe number of the fourth lens element is V4, and the following condition is satisfied:

$0.5 < (V2+V4)/V1 < 1.0.$

30. The imaging lens system of claim 24, wherein a maximum image height of the imaging lens system is ImgH, an entrance pupil diameter of the imaging lens system is EPD, and the following condition is satisfied:

$0.85 < EPD/ImgH < 2.0.$

* * * * *